US007092875B2

(12) United States Patent
Tsuchinaga et al.

(10) Patent No.: US 7,092,875 B2
(45) Date of Patent: Aug. 15, 2006

(54) SPEECH TRANSCODING METHOD AND APPARATUS FOR SILENCE COMPRESSION

(75) Inventors: Yoshiteru Tsuchinaga, Fukuoka (JP); Yasuji Ota, Kawasaki (JP); Masanao Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 867 days.

(21) Appl. No.: 10/108,153

(22) Filed: Mar. 27, 2002

(65) Prior Publication Data

US 2003/0065508 A1 Apr. 3, 2003

(30) Foreign Application Priority Data

Aug. 31, 2001 (JP) ............................ 2001-263031

(51) Int. Cl.
*G10L 11/02* (2006.01)
*G10L 19/12* (2006.01)
*H04J 3/22* (2006.01)

(52) U.S. Cl. ...................... 704/210; 704/215; 704/221; 370/466

(58) Field of Classification Search ................ 704/206, 704/210, 215, 221, 222, 230; 370/466
See application file for complete search history.

(56) References Cited

U.S. PATENT DOCUMENTS

| | | | | |
|---|---|---|---|---|
| 5,818,843 | A * | 10/1998 | Virdee et al. | 370/435 |
| 5,835,889 | A * | 11/1998 | Kapanen | 704/215 |
| 5,953,666 | A * | 9/1999 | Lehtimaki | 455/439 |
| 5,991,716 | A * | 11/1999 | Lehtimaki | 704/212 |
| 6,606,593 | B1 * | 8/2003 | Jarvinen et al. | 704/223 |
| 6,631,139 | B1 * | 10/2003 | El-Maleh et al. | 370/466 |
| 6,766,291 | B1 * | 7/2004 | Chu et al. | 704/215 |
| 6,816,832 | B1 * | 11/2004 | Alanara et al. | 704/205 |
| 6,829,579 | B1 * | 12/2004 | Jabri et al. | 704/221 |
| 6,832,195 | B1 * | 12/2004 | Johnson | 704/270 |
| 6,850,883 | B1 * | 2/2005 | Kapanen et al. | 704/212 |
| 6,961,346 | B1 * | 11/2005 | Michalewicz et al. | 370/465 |
| 7,012,901 | B1 * | 3/2006 | Jagadeesan et al. | 370/260 |
| 2003/0135372 | A1 * | 7/2003 | Zinser et al. | 704/258 |
| 2003/0144835 | A1 * | 7/2003 | Zinser et al. | 704/219 |
| 2003/0177004 | A1 * | 9/2003 | Jabri et al. | 704/219 |
| 2003/0195745 | A1 * | 10/2003 | Zinser et al. | 704/219 |

(Continued)

FOREIGN PATENT DOCUMENTS

JP 8-146997 6/1996

(Continued)

OTHER PUBLICATIONS

Ota et al., "Speech Coding Translation for IP and 3G Mobile Integrated Network," IEEE International Conference on Communications, 2002. ICC 2002, Apr. 28, 2002 to May 2, 2002, vol. 1, pp. 114 to 118.*

(Continued)

*Primary Examiner*—Martin Lerner
(74) *Attorney, Agent, or Firm*—Karten Muchin Rosenman LLP

(57) ABSTRACT

A first CN code (silence code) obtained by encoding a silence signal, which is contained in an input signal, by a silence compression function of a first speech encoding scheme is transcoded to a second CN code of a second speech encoding scheme without decoding the first CN code to a CN signal. For example, the first CN code is demultiplexed into a plurality of first element codes by a code demultiplexer, the first element codes are each transcoded to a plurality of second element codes that constitute the second CN code, and the second element codes obtained by this transcoding are multiplexed to output the second CN code.

15 Claims, 24 Drawing Sheets

U.S. PATENT DOCUMENTS

| | | | | |
|---|---|---|---|---|
| 2005/0027517 | A1* | 2/2005 | Jabri et al. | 704/219 |
| 2005/0049855 | A1* | 3/2005 | Chong-White et al. | 704/219 |
| 2005/0258983 | A1* | 11/2005 | Jabri et al. | 341/50 |

FOREIGN PATENT DOCUMENTS

| | | |
|---|---|---|
| WO | 00/48170 | 8/2000 |
| WO | 01/08136 | 2/2001 |

OTHER PUBLICATIONS

Kang et al., "Improving Transcoding Capability of Speech Coders in Clean and Frame Erasured Channel Environments," 2000 IEEE Workshop on Speech Coding, 2000, Sep. 17-20, 2000, pp. 78 to 80.*

* cited by examiner

SPEECH TRANSCODING METHOD AND APPARATUS FOR SILENCE COMPRESSION

BACKGROUND OF THE INVENTION

This invention relates to a speech transcoding method and apparatus. More particularly, the invention relates to a speech transcoding method and apparatus for transcoding speech code, which has been encoded by a speech code encoding apparatus used in a network such as the Internet or by a speech encoding apparatus used in a mobile/cellular telephone system, to speech code of another encoding scheme.

There has been an explosive increase in subscribers to cellular telephones in recent years and it is predicted that the number of such users will continue to grow in the future. Speech communication using the Internet (Speech over IP, or VoIP) is coming into increasingly greater use in intracorporate networks (intranets) and for the provision of long-distance telephone service. In such speech communication systems, use is made of speech encoding technology for compressing speech in order to utilize the communication channel effectively. The speech encoding scheme used, however, differs from system to system. For example, with regard to W-CDMA expected to be employed in the next generation of cellular telephone systems, AMR (Adaptive Multi-Rate) has been adopted as the common global speech encoding scheme. With VoIP, on the other hand, a scheme compliant with ITU-T Recommendation G.729A is being used widely as the speech encoding method.

It is believed that the growing popularity of the Internet and cellular telephones will be accompanied in the future by an increase in traffic involving speech communication by Internet and cellular telephone users. However, since the speech encoding schemes for cellular telephone networks differ from those of networks such as the Internet, as mentioned above, communication between networks cannot proceed without making transcoding. In the prior art, therefore, it is necessary to transcode speech code encoded by one network to speech code according to a speech encoding scheme used in another network by employing a speech transcoder.

Speech Transcoding

FIG. 15 illustrates the principle of a typical speech transcoding method according to the prior art. This method shall be referred to below as "prior art 1". In FIG. 15, only a case where speech input to a terminal 1 by user A is sent to a terminal 2 of user B will be considered. It is assumed here that the terminal 1 possessed by user A has only an encoder 1*a* of an encoding scheme 1 and that the terminal 2 of user B has only a decoder 2*a* of an encoding scheme 2.

Speech that has been produced by user A on the transmitting side is input to the encoder 1*a* of encoding scheme 1 incorporated in terminal 1. The encoder 1*a* encodes the input speech signal to a speech code of the encoding scheme 1 and outputs this code to a transmission line 1*b*. When the speech code of encoding scheme 1 enters via the transmission line 1*b*, a decoder 3*a* of the speech transcoder 3 decodes the speech code of encoding scheme 1 to decoding speech. An encoder 3*b* of the speech transcoder 3 then encodes the decoding speech signal to speech code of encoding scheme 2 and sends this speech code to a transmission line 2*b*. The speech code of encoding scheme 2 is input to the terminal 2 through the transmission line 2*b*. Upon receiving the speech code of encoding scheme 2 as an input, the decoder 2*a* decodes the speech code of the encoding scheme 2 to decoding speech. As a result, the user B on the receiving side is capable of hearing decoding speech. Processing for decoding speech that has once been encoded and then re-encoding the decoded speech is referred to as "tandem connection".

In the composition of prior art 1, use is made of the tandem connection in which speech code that has been encoded by speech encoding scheme 1 is decoded to decoding speech, after which encoding is performed again by speech encoding scheme 2. As a consequence, a problem which arises is a marked decline in the quality of decoding speech and an increase in delay.

An example of a method of solving this problem of the tandem connection has been proposed (see the specification of Japanese Patent Application No. 2001-75427). The proposed method decomposes speech code into parameter code such as LSP code and pitch-lag code and converts each parameter code separately to code of another speech encoding scheme without restoring speech code to a speech signal. The principle of this method is illustrated in FIG. 16. This method shall be referred to below as "prior art 2".

Encoder 1*a* of encoding scheme 1 encodes a speech signal produced by user A to a speech code of encoding scheme 1 and sends this speech code to transmission line 1*b*. A speech transcoding unit 4 transcodes the speech code of encoding scheme 1 that has entered from the transmission line 1*b* to a speech code of encoding scheme 2 and sends this speech code to transmission line 2*b*. Decoder 2*a* in terminal 2 decodes decoding speech from the speech code of encoding scheme 2 that enters via the transmission line 2*b*, and user B is capable of hearing decoding speech.

The encoding scheme 1 encodes a speech signal by $\hat{1}$ a first LSP code obtained by quantizing LSP parameters found from linear prediction coefficients (LPC coefficients) obtained by frame-by-frame linear prediction analysis; $\hat{2}$ a first pitch-lag code, which specifies the output signal of an adaptive codebook that is for outputting a periodic speech-source signal; $\hat{3}$ a first algebraic code (noise code), which specifies the output signal of an algebraic codebook (or noise codebook) that is for outputting a noisy speech-source signal; and $\hat{4}$ a first gain code obtained by quantizing pitch gain, which represents the amplitude of the output signal of the adaptive codebook, and algebraic gain, which represents the amplitude of the output signal of the algebraic codebook. The encoding scheme 2 encodes a speech signal by $\hat{1}$ a second LPC code, $\hat{2}$ a second pitch-lag code, $\hat{3}$ a second algebraic code (noise code) and $\hat{4}$ a second gain code, which are obtained by quantization in accordance with a quantization method different from that of the encoding scheme 1.

The speech transcoding unit 4 has a code demultiplexer 4*a*, an LSP code converter 4*b*, a pitch-lag code converter 4*c*, an algebraic code converter 4*d*, a gain code converter 4*e* and a code multiplexer 4*f*. The code demultiplexer 4*a* demultiplexes the speech code of the encoding scheme 1, which code enters from the encoder 1*a* of terminal 1 via the transmission line 1*b*, into codes of a plurality of components necessary to reconstruct a speech signal, namely $\hat{1}$ LSP code, $\hat{2}$ pitch-lag code, $\hat{3}$ algebraic code and $\hat{4}$ gain code. These codes are input to the code converters 4*b*, 4*c*, 4*d* and 4*e*, respectively. The latter transcode the entered LSP code, pitch-lag code, algebraic code and gain code of the encoding scheme 1 to LSP code, pitch-lag code, algebraic code and gain code of the encoding scheme 2, respectively, and the code multiplexer 4*f* multiplexes these codes of the encoding scheme 2 and sends the multiplexed signal to the transmission line 2*b*.

FIG. 17 is a block diagram illustrating the speech transcoding unit in which the construction of the code converters 4*b* to 4*e* is clarified. Components in FIG. 17 identical with those shown in FIG. 16 are designated by like reference characters. The code demultiplexer 4*a* demultiplexes an LSP code 1, a pitch-lag code 1, an algebraic code 1 and a gain code 1 from the speech code based upon encoding scheme 1 that enters from the transmission line via an input terminal #1, and inputs these codes to the code converters 4*b*, 4*c*, 4*d* and 4*e*, respectively.

The LSP code converter 4*b* has an LSP dequantizer $4b_1$ for dequantizing the LSP code 1 of encoding scheme 1 and outputting an LSP dequantized value, and an LSP quantizer $4b_2$ for quantizing the LSP dequantized value using an LSP quantization table according to encoding scheme 2 and outputting an LSP code 2. The pitch-lag code converter 4*c* has a pitch-lag dequantizer $4c_1$ for dequantizing the pitch-lag code 1 of encoding scheme 1 and outputting a pitch-lag dequantized value, and a pitch-lag quantizer $4c_2$ for quantizing the pitch-lag dequantized value using a pitch-lag quantization table according to the encoding scheme 2 and outputting a pitch-lag code 2. The algebraic code converter 4*d* has an algebraic code dequantizer $4d_1$ for dequantizing the algebraic code 1 of encoding scheme 1 and outputting an algebraic-code dequantized value, and an algebraic code quantizer $4d_2$ for quantizing the algebraic-code dequantized value using an algebraic code quantization table according to the encoding scheme 2 and outputting an algebraic code 2. The gain code converter 4*e* has a gain dequantizer $4e_1$ for dequantizing the gain code 1 of encoding scheme 1 and outputting a gain dequantized value, and a gain quantizer $4e_2$ for quantizing the gain dequantized value using a gain quantization table according to encoding scheme 2 and outputting a gain code 2.

The code multiplexer 4*f* multiplexes the LSP code 2, pitch-lag code 2, algebraic code 2 and gain code 2, which are output from the quantizers $4b_2$, $4c_2$, $4d_2$ and $4e_2$, respectively, thereby creating a speech code based upon encoding scheme 2, and sends this speech code to the transmission line from an output terminal #2.

In the tandem connection scheme (prior art 1) illustrated in FIG. 15, the input is decoding speech that is obtained by decoding, into speech, a speech code that has been encoded according to encoding scheme 1, the decoding speech is encoded again and then is decoded. As a consequence, since speech parameters are extracted from decoding speech in which the amount of information has been reduced greatly in comparison with the original input speech signal to re-encoding (i.e., speech-information compression), the speech code obtained thereby is not necessarily the optimum speech code. By contrast, in accordance with the transcoding apparatus according to prior art 2 shown in FIG. 16, the speech code of encoding scheme 1 is transcoded to the speech code of encoding scheme 2 via the process of dequantization and quantization. As a result, it is possible to carry out speech transcoding with much less degradation in comparison with the tandem connection of prior art 1. An additional advantage is that since it is unnecessary to effect decoding into speech even once in order to perform the speech transcoding, there is little of the delay that is a problem with the conventional tandem connection.

Silence Compression

An actual speech communication system generally has a silence compression function for providing a further improvement in the efficiency of information transmission by making effective use of silence segments contained in speech. FIG. 18 is a conceptual view of a silence compression function. Human conversation includes silence segments such as quiet intervals or background-noise intervals that reside between speech activity segments. Transmitting speech information over silence segments is unnecessary, making it possible to utilize the communication channel effectively. This is the basic approach taken in silence compression. However, when a segment between speech activity intervals reconstructed on the receiving side becomes completely silent, an acoustically unnatural sensation is produced. Ordinarily, therefore, natural noise (so-called "comfort noise") that will not give rise to an acoustically unnatural sensation is generated on the receiving side. In order to generate comfort noise that resembles an input signal, it is necessary to send comfort-noise information (referred to below as "CN information") from the transmitting side. However, the quantity of information in CN information is small in comparison with speech. Moreover, since the nature of silence segments varies only gradually, CN information need not be transmitted at all times. Since this makes it possible to greatly reduce the quantity of transmitted information in comparison with the information in speech activity segments, the overall transmission efficiency of the communication channel can be improved. Such a silence compression function is implemented by a VAD (Speech Activity Detection) unit for detecting speech activity and silence segments, a DTX (Discontinuous Transmission) unit for controlling the generation and transmission of CN information on the transmitting side, and a CNG (Comfort Noise Generator) for generating comfort noise on the receiving side.

The principle of operation of the silence compression function will now be described with reference to FIG. 19.

On the transmitting side, an input signal that has been divided up into fixed-length frames (e.g., 80 sample/10 ms) is applied to a VAD 5*a*, which detects speech activity segments. The VAD 5*a* outputs a decision signal vad_flag, which is logical "1" when a speech activity segment is detected and logical "0" when a silence segment is detected. In case of a speech activity segment (vad_flag=1), switches SW1 to SW4 are all switched over to a speech side so that a speech encoder 5*b* on the transmitting side and a speech decoder 6*a* on the receiving side respectively encode and decode the speech signal in accordance with an ordinary speech encoding scheme (e.g., G.729A or AMR). In case of a silence segment (vad_flag=0), on the other hand, switches SW1 to SW4 are all switched over to a silence side so that a silence encoder 5*c* on the transmitting side executes silence-signal encoding processing, i.e., control for generating and transmitting CN information, under the control of a DTX unit (not shown), and so that a silence decoder 6*b* on the receiving side executes decoding processing, i.e., generates comfort noise, under the control of a CNG unit (not shown).

The operation of the silence encoder 5*c* and silence decoder 6*b* will be described next. FIG. 20 is a block diagram of this encoder and decoder, and FIGS. 21A, 21B are flowcharts of processing executed by the silence encoder 5*c* and silence decoder 6*b*, respectively.

A CN information generator 7*a* analyzes the input signal frame by frame and calculates a CN parameter for generation of comfort noise in a CNG unit 8*a* on the receiving side(step S101). Usually, approximate shape information of the frequency characteristic and amplitude information are used as CN parameters. A DTX controller 7*b* controls a switch 7*c* so as to control, frame by frame, whether the obtained CN information is or is not to be transmitted to the receiving side (S102). Methods of control include a method of exercising control adaptively in accordance with the nature of a signal and a method of exercising control periodically, i.e., at regular intervals. If transmission of the CN information is necessary ("YES" at step S102) the CN parameter is input to a CN quantizer 7*d*, which quantizes the CN parameter, generates CN code (S103) and transmits the code to the receiving side as channel data (S104). A frame in which CN information is transmitted shall be referred to as an "SID (Silence Insertion Descriptor) frame" below. Frames other than these frames are frames ("non-transmit frames") in which CN information is not transmitted. If a "NO" decision is rendered at step S102, nothing is transmitted in the other frames (S105).

The CNG unit 8*a* on the receiving side generates comfort noise based upon the transmitted CN code. More specifically, the CN code transmitted from the transmitting side is input to a CN dequantizer 8*b*, which dequantizes this CN code to obtain the CN parameter (S111). The CNG unit 8*a* then uses this CN parameter to generate comfort noise (S112). In the case of a non-transmit frame, namely a frame in which a CN parameter does not arrive, comfort noise is generated using the CN parameter that was received last (S113).

Thus, in an actual speech communication system, a silence segment in a conversation is discriminated and information for generating acoustically natural noise on the receiving side is transmitted intermittently in this silence segment, thereby making it possible to further improve transmission efficiency. A silence compression function of this kind is adopted in the next-generation cellular telephone network and VoIP network mentioned earlier, in which schemes that differ depending upon the system are employed.

The silence compression functions used in G.729A (VoIP) and AMR (next-generation mobile telephone), which are typical encoding schemes, will now be described.

These parameters are obtained by analyzing the input signal frame by frame. A method of generating the CN information in G.729A and AMR will be described.

In G.729A, the LPC information is found as an average value of LPC coefficients over the last six frames inclusive of the present frame. The average value obtained or the LPC coefficient of the present frame is eventually used as the CN information taking account signal fluctuation in the vicinity of the SID frame. The decision as to which should be chosen is made by measuring distortion between the average LPC and the present LPC coefficient. If signal fluctuation (a large distortion) has been determined, the LPC coefficient of the present frame is used. The frame power information is found as a value obtained by averaging logarithmic power of an LPC prediction residual signal over 0 to 3 frames inclusive of the present frame. Here the LPC prediction residual signal is a signal obtained by passing the input signal through an LPC inversion filter frame by frame.

In AMR, the LPC information is found as an average value of LPC coefficients over the last eight frames inclusive of the present frame. The calculation of the average value is performed in a domain in which LPC coefficients have been converted to LSP parameters. Here LSP is a parameter of a frequency domain in which cross conversion with an LPC coefficient is possible. The frame-signal power information is found as a value obtained by averaging logarithmic power of the input signal over the last eight frames (inclusive of the present frame).

Thus, LPC information and frame-signal power information is used as the CN information in both the G.729A and AMR schemes, though the methods of generation (calculation) differ.

TABLE 1

| | | COMPARISON OF G.729A AND AMR SILENCE COMPRESSION FUNCTIONS | |
|---|---|---|---|
| | | G.729A | AMR |
| PROCESSED FRAME LENGTH | | 10 ms (80 SAMPLES) | 20 ms (160 SAMPLES) |
| TRANSMITTED CN INFORMATION | | LPC COEFFICIENTS FRAME SIGNAL POWER | LPC COEFFICIENTS FRAME SIGNAL POWER |
| METHOD OF GENERATING CN INFORMATION | LPC INFORMATION | AVERAGE LPC COEFFICIENT OVER LAST 6 FRAMES OR LPC COEFFICIENT OF PRESENT FRAME | AVERAGE LPC COEFFICIENT OVER LAST 8 FRAMES (CALCULATED IN LSP DOMAIN) |
| | FRAME SIGNAL POWER INFORMATION | AVERAGE LOGARITHMIC POWER OVER LAST 0–3 FRAMES (LSP RESIDUAL-SIGNAL DOMAIN) | AVERAGE LOGARITHMIC POWER OVER LAST 8 FRAMES (INPUT SIGNAL DOMAIN) |
| BIT ASSIGNMENT OF CN CODE | LPC INFORMATION | 10 BITS (QUANTIZATION IN LSP DOMAIN) | 29 BITS (QUANTIZATION IN LSP DOMAIN) |
| | FRAME SIGNAL POWER | 5 BITS | 6 BITS |
| | TOTAL | 15 BITS | 35 BITS |
| DTX CONTROL METHOD | | ADAPTIVE CONTROL (TRANSMISSION AT IRREGULAR INTERVALS IN ACCORDANCE WITH SILENCE SIGNAL) | FIXED CONTROL (TRANSMISSION PERIODICALLY EVERY 8 FRAMES) HANGOVER CONTROL |

LPC coefficients (linear prediction coefficients) and frame signal power are used as CN information in both G.729A and AMR. An LPC coefficient is a parameter that represents the approximate shape of the frequency characteristic of the input signal, and frame signal power is a parameter that represents the amplitude characteristic of the input signal.

The CN information is quantized to CN code and the CN code is transmitted to a decoder. The bit assignment of the CN code in the G.729A and AMR schemes is indicated in Table 1. In G.729A, the LPC information is quantized at 10 bits and the frame power information is quantized at five bits. In the AMR scheme, on the other hand, the LPC information is quantized at 29 bits and the frame power information is quantized at six bits. Here the LPC information is converted to an LSP parameter and quantized. Thus, bit assignment for quantization in the G.729A scheme differs from that in the AMR scheme. FIGS. 22A and 22B are diagrams illustrating the structure of silence code (CN code) in the G.729A and AMR schemes, respectively.

In G.729A, the size of silence code is 15 bits, as shown in FIG. 22A, and is composed of LSP code I_LSPg (10 bits) and power code I_POWg (5 bits). Each code is constituted by an index (element number) of a codebook possessed by a G.729A quantizer. The details are as follows: (1) The LSP code I_LSPg is composed of codes $L_{G1}$ (1 bit), $L_{G2}$ (5 bits) and $L_{G3}$ (4 bits), in which $L_{G1}$ is prediction-coefficient changeover information of an LSP quantizer, and $L_{G2}$, $L_{G3}$ are indices of codebooks $CB_{G1}$, $CB_{G2}$ of the LSP quantizer, and (2) the power code I_POWg is an index of a codebook $CB_{G3}$ of a power quantizer.

In the AMR scheme, the size of silence code is 35 bits, as shown in FIG. 22B, and is composed of LSP code I_LSPa (29 bits) and power code I_POWa (6 bits). The details are as follows: (1) The LSP code I_LSPa is composed of codes $L_{A1}$ (3 bits), $L_{A2}$ (8 bits), $L_{A3}$ (9 bits) and $L_{A4}$ (9 bits), in which the codes are indices of codebooks $GB_{A1}$, $GB_{A2}$, $GB_{A3}$, $GB_{A4}$ of an LSP quantizer, and (2) the power code I_POWa is an index of a codebook $GB_{A5}$ of a power quantizer.

DTX Control

A DTX control method will be described next. FIG. 23 illustrates the temporal flow of DTX control in G.729A, and FIGS. 24, 25 illustrate the temporal flow of DTX control in AMR.

When a VAD unit detects a change from a speech activity segment (VAD_flag=1) to a silence segment (VAD_flag=0) in the G.729A scheme, the first frame in the silence segment is set as an SID frame. The SID frame is created by generation of CN information and quantization of CN information by the above-described method and is transmitted to the receiving side. In the silence segment, signal fluctuation is observed frame by frame, only a frame in which fluctuation has been detected is set as an SID frame and CN information is transmitted again in the SID frame. A frame for which fluctuation has not been detected is set as a non-transmit frame and no information is transmitted in this frame. A limitation is imposed according to which at least two non-transmit frames are included between SID frames. Fluctuation is detected by measuring the amount of change in CN information between the present frame and the SID frame transmitted last. In the G.729A scheme, as mentioned above, the setting of an SID frame is performed adaptively with respect to a fluctuation in the silence signal.

DTX control in the AMR scheme will be described with reference to FIGS. 24 and 25. In the AMR scheme, the method of setting SID frames is such that basically an SID frame is set periodically every eight frames, as shown in FIG. 24, unlike the adaptive control method in the G.729A scheme. However, hangover control is carried out, as shown in FIG. 25, at a point where there is a change to a silence segment following a long speech activity segment. More specifically, seven frames following the point of change are set as a speech activity segment regardless of the change to the silence segment (VAD_flag=0), and the usual speech encoding processing is executed with regard to these frames. This interval of seven frames is referred to as “hangover”. Hangover is set in a case where the number of frames (P-FRM) that follow the SID frame that was set last is 23 frames or greater. As a result of setting hangover, CN information at the point of change (the point at which the silence segment starts) is prevented from being found from a characteristic parameter of the speech activity segment (the last eight frames), enabling speech quality at the point of change from speech activity to silence to be improved.

The eighth frame is then set as the first SID frame (SID_FIRST frame). In the SID-FIRST frame, however, CN information is not transmitted. The reason for this is that the CN information can be generated from a decoded signal in the hangover interval by a decoder on the receiving side. The third frame after the SID_FIRST frame is set as an SID_UPDATE frame and here CN information is transmitted for the first time. In the silence segment from this point onward, a SID_UPDATE frame is set every eight frames. The SID_UPDATE frame is created by the above-described method and is transmitted to the receiving side. Frames other than these are set as non-transmit frames and CN information is not transmitted in these non-transmit frames.

In a case where the number of frames that follow the SID frame that was set last is less than 23 frames, as shown in FIG. 24, hangover control is not carried out. In this case, the frame at the point of change (the first frame of the silence segment) is set as SID_UPDATE. However, CN information is not calculated and the CN information transmitted last is transmitted again in this frame. As described above, DTX control in the AMR scheme transmits CN information under fixed control without performing adaptive control of the G.729A type, and therefore hangover control is exercised as appropriate taking into consideration the point which the change from speech activity to silence occurs.

As described above, the basic theory of the silence compression function according to the G.729A scheme is the same as that of the AMR scheme but the generation and quantization of CN information, and DTX control method differ between the two schemes.

FIG. 26 is a block diagram for a case where each of the communication systems has the silence compression function according to prior art 1. In the case of the tandem connection, the structure is such that speech code according to encoding scheme 1 is decoded to a decoding signal and the decoding signal is encoded again in accordance with encoding scheme 2, as described above. In a case where each system has the silence compression function, as shown in FIG. 26, a VAD unit 3*c* in the speech transcoder 3 renders a speech activity/silence segment decision with regard to the decoding signal obtained by encoding/decoding (information compression) performed according to encoding scheme 1. As a consequence, there are instances where the precision of the speech activity/silence segment decision by the VAD unit 3*c* declines and problems arise such as muted speech at the beginning of an utterance, which is caused by an erroneous decision. The end result is a decline in speech quality. Though a conceivable countermeasure is to process all segments as speech activity segments in encoding scheme 2, this approach will not allow optimum silence compression to be performed and the originally intended effect of improving transmission efficiency by silence compression will be lost. Furthermore, in a silence segment, CN information according to encoding scheme 2 is obtained from comfort noise generated by the decoder 3*a* of encoding scheme 1, and this is not necessarily the best CN information for generating noise that resembles the input signal.

Further, though prior art 2 is a speech transcoding method that is superior to prior art 1 (the tandem connection) in terms of diminished degradation of speech quality and transmission delay, a problem with this scheme is that it does not take the silence compression function into consideration. In other words, since prior art 2 assumes that information is information obtained by encoding entered speech code as a speech activity segment at all times, a normal transcoding operation cannot be carried out when an SID frame or non-transmit frame is generated by the silence compression function.

SUMMARY OF THE INVENTION

Accordingly, an object of the present invention, which concerns communication between two speech communication systems having silence encoding methods that differ from each other, is to transcode CN code, which has been obtained by encoding according to a silence encoding method on the transmitting side, to CN code that conforms to a silence encoding method on the receiving side without decoding the CN code to a CN signal.

Another object of the present invention is to transcode CN code on the transmitting side to CN code on the receiving side taking into account differences in frame length and in DTX control between the transmitting and receiving sides.

A further object of the present invention is to achieve high-quality silence-transcoding and speech transcoding in communication between two speech communication systems having silence compression functions that differ from each other.

According to a first aspect of the present invention, a first silence code obtained by encoding a silence signal, which is contained in an input signal, by a silence compression function of a first speech encoding scheme is converted to a second silence code of a second speech encoding scheme without first decoding the first silence code to a silence signal. For example, first silence code is demultiplexed into a plurality of first element codes, the plurality of first element codes are converted to a plurality of second element codes that constitute second silence code, and the plurality of second element codes obtained by this conversion are multiplexed to output the second silence code.

In accordance with the first aspect of the present invention, in communication between two speech communication systems having silence compression functions that differ from each other, silence code (CN code) obtained by encoding performed according to the silence encoding method on the transmitting side can be transcoded to silence code (CN code) that conforms to a silence encoding method on the receiving side without the CN code being decoded to a CN signal.

According to a second aspect of the present invention, silence code is transmitted only in a prescribed frame (a silence frame) of a silence segment, silence code is not transmitted in other frames (non-transmit frames) of the silence segment, and frame-type information, which indicates the distinction among a speech activity frame, a silence frame and a non-transmit frame, is appended to code information on a per-frame basis. When silence code is transcoded, the type of frame of the code is identified based upon the frame-type information. In case of a silence frame and non-transmit frame, first silence code is transcoded to second silence code taking into consideration a difference in frame length and a dissimilarity in silence-code transmission control between first and second silence encoding schemes.

For example, when (1) the first silence encoding scheme is a scheme in which averaged silence code is transmitted every predetermined number of frames in a silence segment and silence code is not transmitted in other frames in the silence segment, (2) the second silence encoding scheme is a scheme in which silence code is transmitted only in frames wherein the rate of change of a silence signal in a silence segment is large, silence code is not transmitted in other frames in the silence segment and, moreover, silence code is not transmitted successively, and (3) frame length in the first silence encoding scheme is twice frame length in the second silence encoding scheme, (a) code information of a non-transmit frame in the first silence encoding scheme is converted to code information of two non-transmit frames in the second silence encoding scheme, and (b) code information of a silence frame in the first silence encoding scheme is converted to two frames of code information of a silence frame and code information of a non-transmit frame in the second silence encoding scheme.

Further, if, when there is a change from a speech activity segment to a silence segment, the first silence encoding scheme regards n successive frames, inclusive of a frame at a point where the change occurred, as speech activity frames and transmits speech code in these n successive frames, and adopts the next frame as an initial silence frame, which is not inclusive of silence code, and transmits frame-type information in this next frame, then (a) when the initial silence frame in the first silence encoding scheme has been detected, dequantized values obtained by dequantizing speech code of the immediately preceding n speech activity frames in the first speech encoding scheme are averaged to obtain an average value, and (b) the average value is quantized to thereby obtain silence code in a silence frame of the second silence encoding scheme.

In another example, (1) the first silence encoding scheme is a scheme in which silence code is transmitted only in frames wherein the rate of change of a silence signal in a silence segment is large, silence code is not transmitted in other frames in the silence segment and, moreover, silence code is not transmitted successively, (2) the second silence encoding scheme is a scheme in which averaged silence code is transmitted every predetermined number N of frames in a silence segment and silence code is not transmitted in other frames in the silence segment, and (3) frame length in the first silence encoding scheme is half frame length in the second silence encoding scheme, (a) dequantized values of each silence code in 2×N successive frames of the first silence encoding scheme are averaged to obtain an average value and the average value is quantized to effect a transcoding to silence code of each frame every N frames in the second silence encoding scheme, and (b) with regard to frames other than the every N frames, code of two successive frames of the first silence encoding scheme is transcoded to code of one non-transmit frame of the second silence encoding scheme irrespective of frame type.

Further, if, when there is a change from a speech activity segment to a silence segment, the second silence encoding scheme regards n successive frames, inclusive of a frame at a point where the change occurred, as speech activity frames and transmits speech code in these n successive frames, and adopts the next frame as an initial silence frame, which is not inclusive of silence code, and transmits only frame-type information in this next frame, then (a) silence code of a first silence frame is dequantized to generate dequantized values of a plurality of element codes and, at the same time, dequantized values of other element codes which is predetermined or random are generated, (b) dequantized values of each of the element codes of two successive frames are quantized using quantization tables of the second speech encoding scheme, thereby effecting a conversion to one frame of speech code of the second speech encoding scheme, and (c) after n frames of speech code of the second speech encoding scheme are output, only frame-type information of the initial silence frame, which is not inclusive of silence code, is transmitted.

In accordance with the second aspect of the present invention, silence code (CN code) on the transmitting side can be transcoded to silence code (CN code) on the receiving side, without execution of decoding into a silence signal, taking into consideration a difference in frame length and a dissimilarity in silence-code transmission control between the transmitting and receiving sides.

Other features and advantages of the present invention will be apparent from the following description taken in conjunction with the accompanying drawings.

BRIEF DESCRIPTION OF THE DRAWINGS

FIG. 26 is a block diagram according to the prior art in a case where the silence compression function is provided.

DESCRIPTION OF THE PREFERRED EMBODIMENTS (A) Principle of the Present Invention FIG. 1 is a diagram useful in describing the principle of the present invention. It is assumed that encoding schemes based upon CELP (Code Excited Linear Prediction) such as AMR or G.729A are used as encoding scheme 1 and encoding scheme 2, and that each encoding scheme has the above-described silence compression function. In FIG. 1, an input signal xin is input to an encoder 51*a* of encoding scheme 1, whereupon the encoder 51*a* encodes the input signal and outputs code data bst1. At this time the encoder 51*a* of encoding scheme 1 executes speech activity/silence segment encoding in conformity with the decision (VAD_flag) rendered by a VAD unit 51*b* in accordance with the silence compression function. Accordingly, the code data bst1 is composed of speech activity code or CN code. The code data bst1 contains frame-type information Ftype1 indicating whether this frame is a speech activity frame or an SID frame (or a non-transmit frame).

Figure 1:
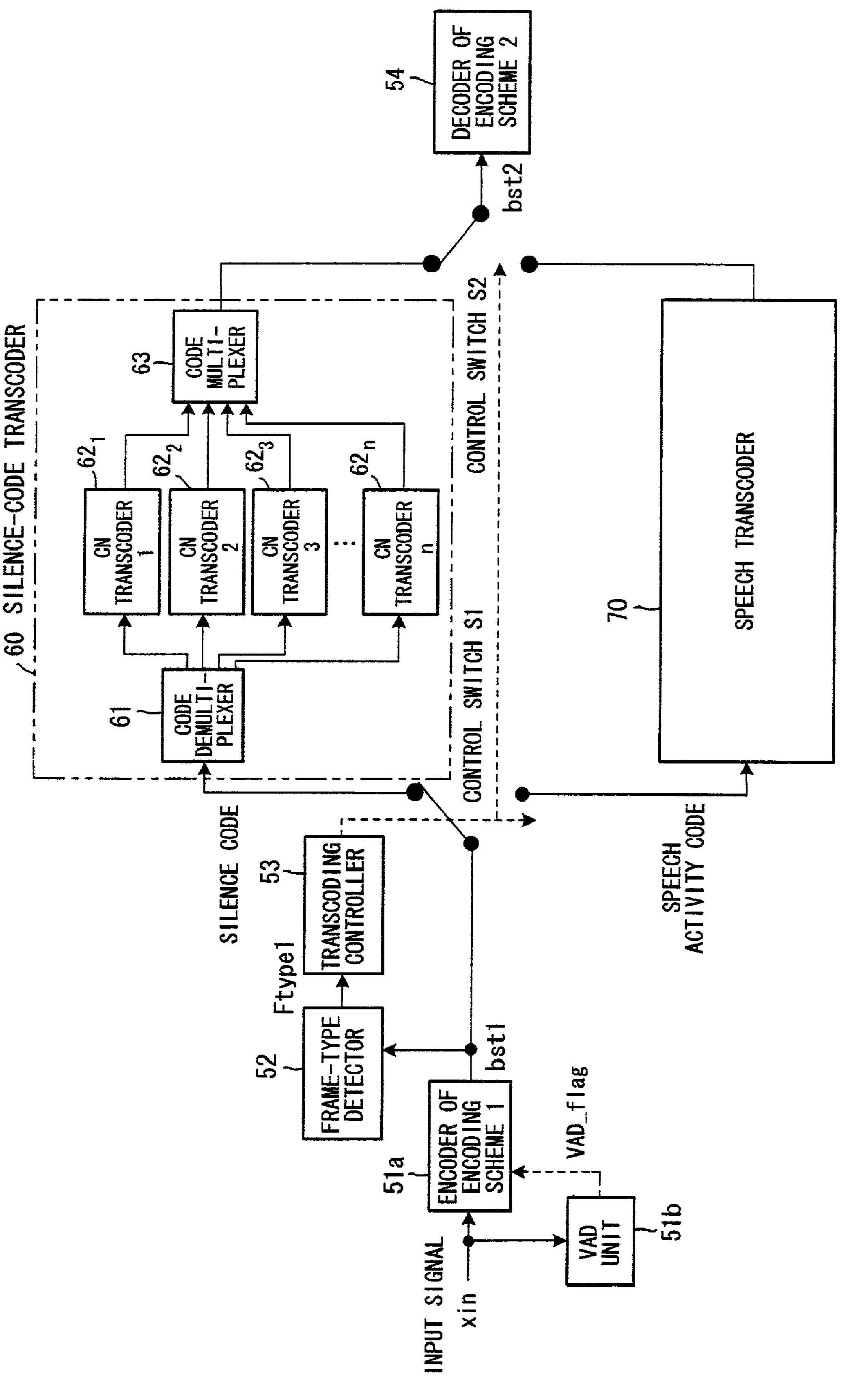
FIG. 1 is a block diagram useful in describing the principle of the present invention.

A frame-type detector 52 detects the frame-type information Ftype1 from the entered code data bst1 and outputs the frame-type information Ftype1 to a transcoding controller 53. The latter identifies speech activity segments and silence segments based upon the frame-type information Ftype1, selects appropriate transcoding processing in accordance with the result of identification and changes over control switches S1, S2.

If the frame-type information Ftype1 indicates an SID frame, a silence-code transcoder 60 is selected. In the silence-code transcoder 60, the code data bst1 is input to a code demultiplexer 61, which demultiplexes the data into element CN codes of the encoding scheme 1. The element CN codes enter each of CN code converters $\mathbf{62}_1$ to $\mathbf{62}_n$. The CN code converters $\mathbf{62}_1$ to $\mathbf{62}_n$ transcode the element CN codes directly to respective ones of element CN codes of encoding scheme 2 without effecting decoding into CN signal. A code multiplexer 63 multiplexes the element CN codes obtained by the transcoding and inputs the multiplexed codes to a decoder 54 of encoding scheme 2 as silence code bst2 of encoding scheme 2.

If the frame-type information Ftype1 indicates a non-transmit frame, then transcoding processing is not executed. In such case the silence code bst2 contains only frame-type information indicative of the non-transmit frame.

In a case where the frame-type information Ftype1 indicates a speech activity frame, a speech transcoder 70 constructed in accordance with prior art 1 or 2 is selected. The speech transcoder 70 executes speech transcoding processing in accordance with prior art 1 or 2 and outputs code data bst2 composed of speech code of encoding scheme 2.

Thus, because frame-type information Ftype1 is included in speech code, frame type can be identified by referring to this information. As a result, a VAD unit can be dispensed with in the speech transcoder and, moreover, erroneous decisions regarding speech activity segments and silence segments can be eliminated.

Further, since CN code of encoding scheme 1 is transcoded directly to CN code of encoding scheme 2 without first being decoded to a decoded signal (CN signal), optimum CN information with respect to the input signal can be obtained on the receiving side. As a result, natural background noise can be reconstructed without sacrificing the effect of raising transmission efficiency by the silence compression function.

Further, transcoding processing can be executed also with regard to SID frames and non-transmit frames in addition to speech activity frames. As a result, it is possible to transcode between different speech encoding schemes possessing a silence compression function.

Further, transcoding between two speech encoding schemes having different silence/speech compression functions can be performed while maintaining the effect of raising transmission efficiency by the silence compression function and while suppressing a decline in quality and transmission delay.

(B) First Embodiment

Figure 2:
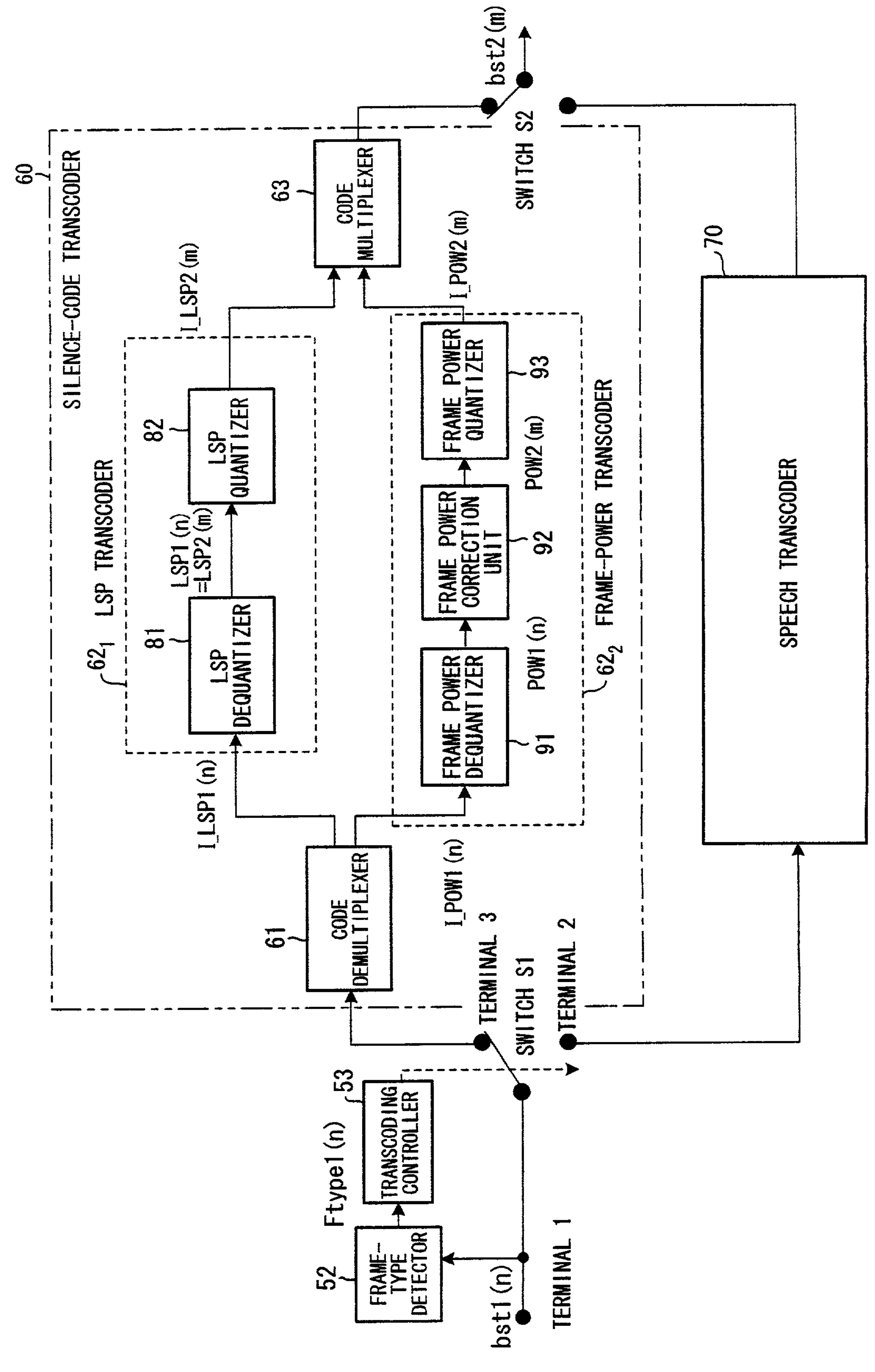
FIG. 2 is a block diagram of a first embodiment of silence-transcoding according to the present invention.
Figure 24:
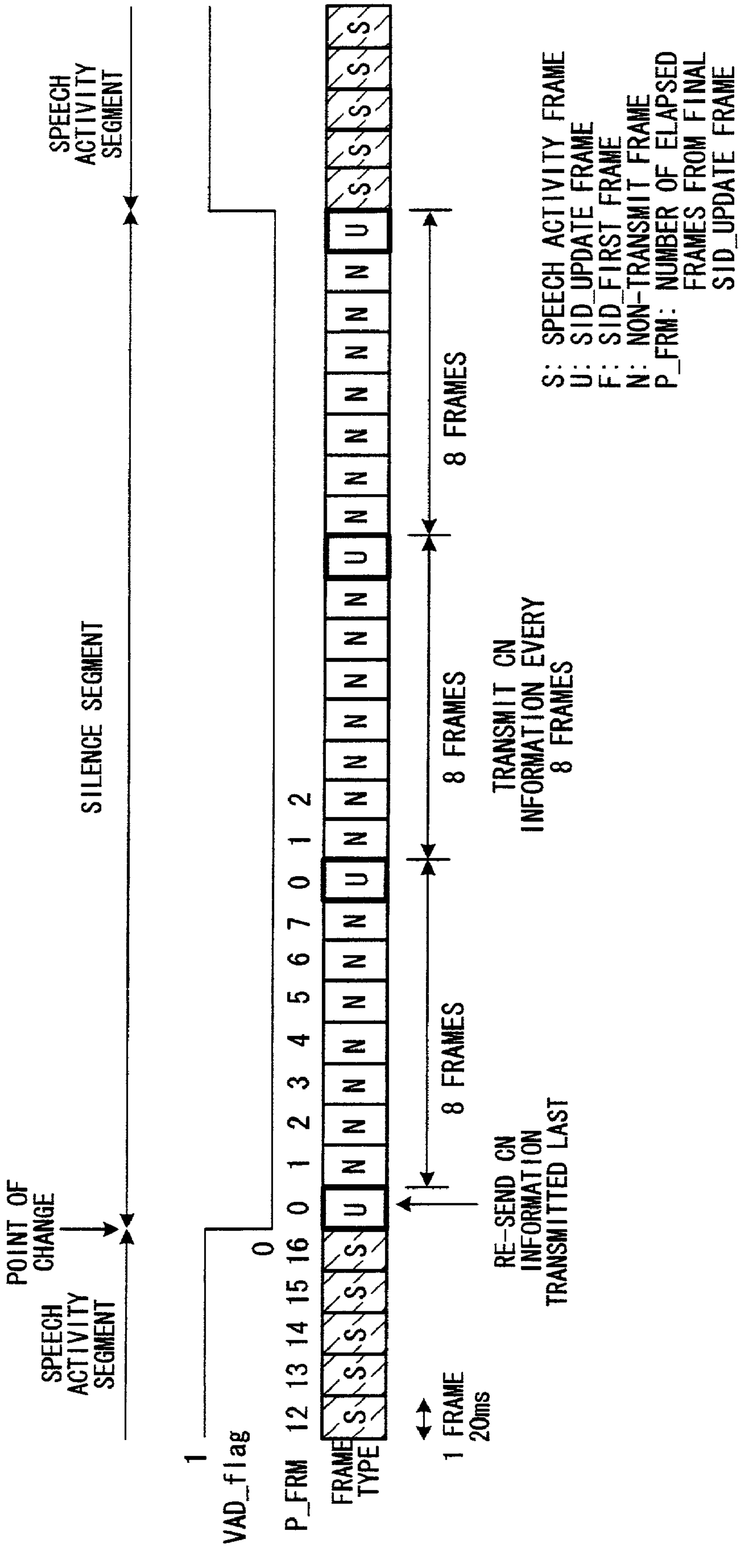
FIG. 24 PRIOR ART
FIG. 24 is a diagram useful in describing DTX control (without hangover control) according to the AMR scheme in the prior art.
Figure 25:
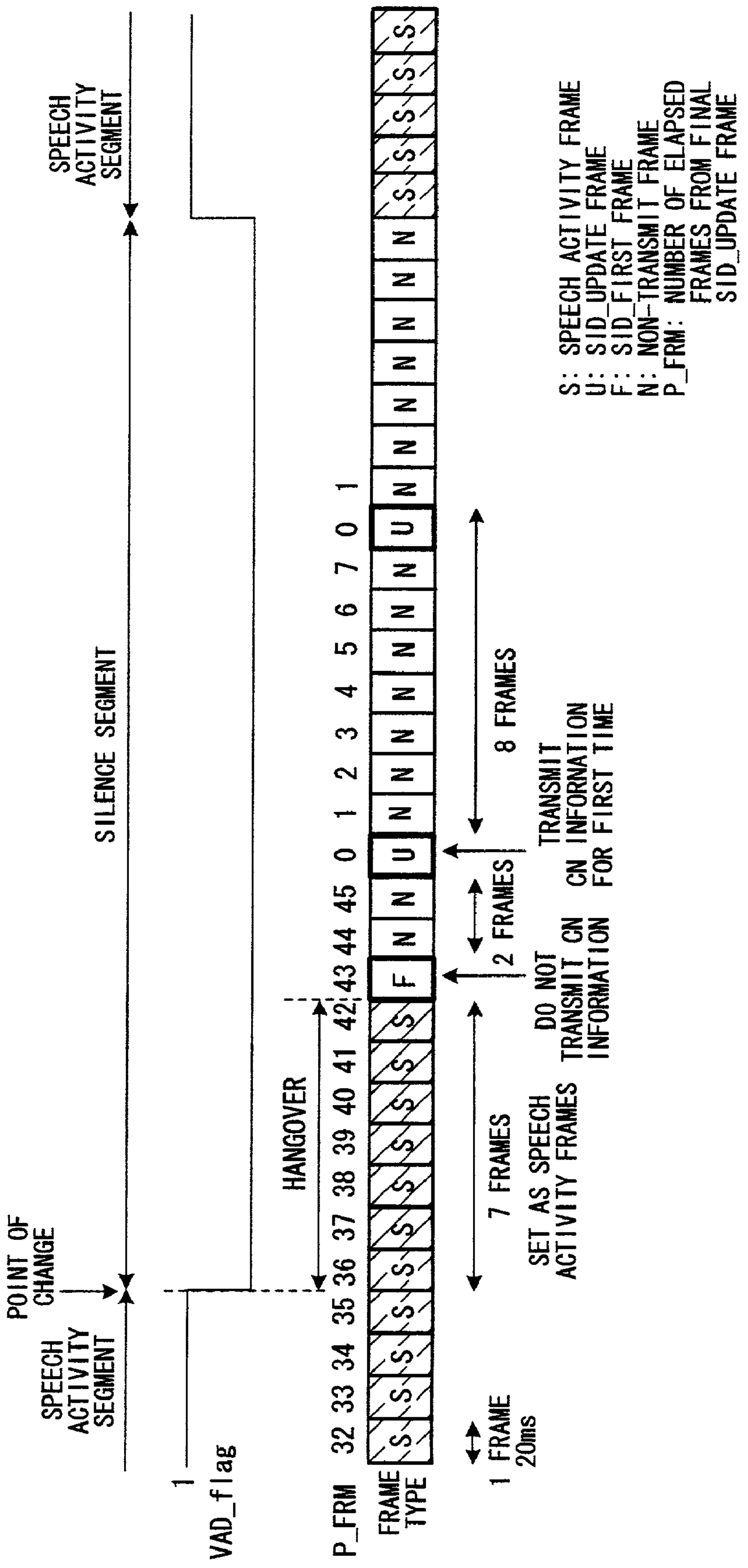
FIG. 25 PRIOR ART
FIG. 25 is a diagram useful in describing DTX control (with hangover control) according to the AMR scheme in the prior art.

FIG. 2 is a block diagram of a first embodiment of silence-transcoding according to the present invention. This illustrates an example in which AMR is used as encoding scheme 1 and G.729A as encoding scheme 2. In FIG. 2, an nth frame of channel data bst1(n), i.e., channel data, enters a terminal 1 from an AMR encoder (not shown). The frame-type detector 52 extracts frame-type information Ftype1(n) contained in the channel data bst1(n) and outputs this information to the transcoding controller 53. Frame-type information Ftype(n) in the AMR scheme is of four kinds, namely speech activity frame (SPEECH), SID frame (SID_FIRST), SID frame (SID_UPDATE) and non-transmit frame (NO_DATA) (see FIGS. 24 and 25). The silence-code transcoder 60 exercises CN-transcoding control in accordance with the frame-type information Ftype1(n).

Figure 3:
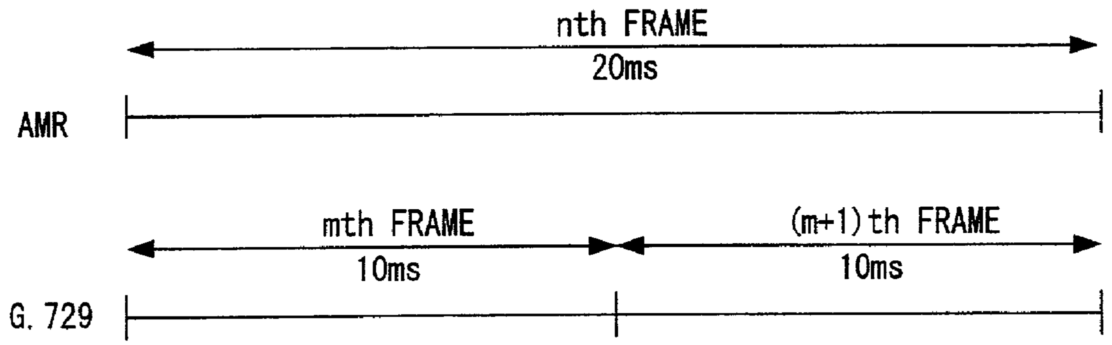
FIG. 3 illustrates frames processed according to the G.729A and AMR schemes.
Figure 4A:
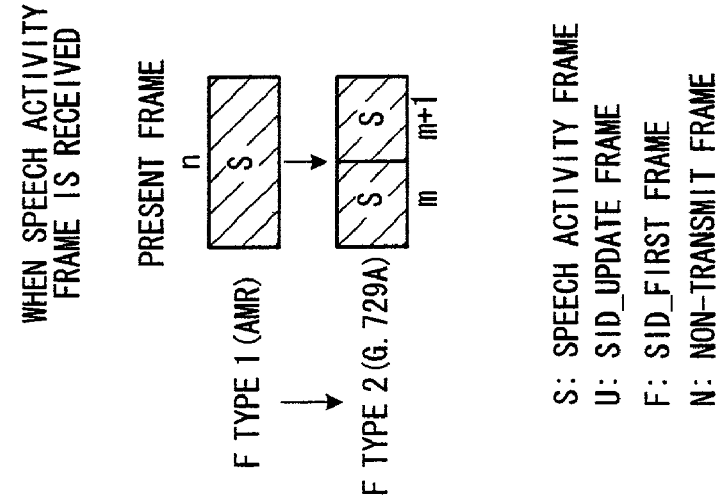
FIGS. 4A to 4C show control procedures for conversion of frame type from AMR to G.729A.
Figure 4B:
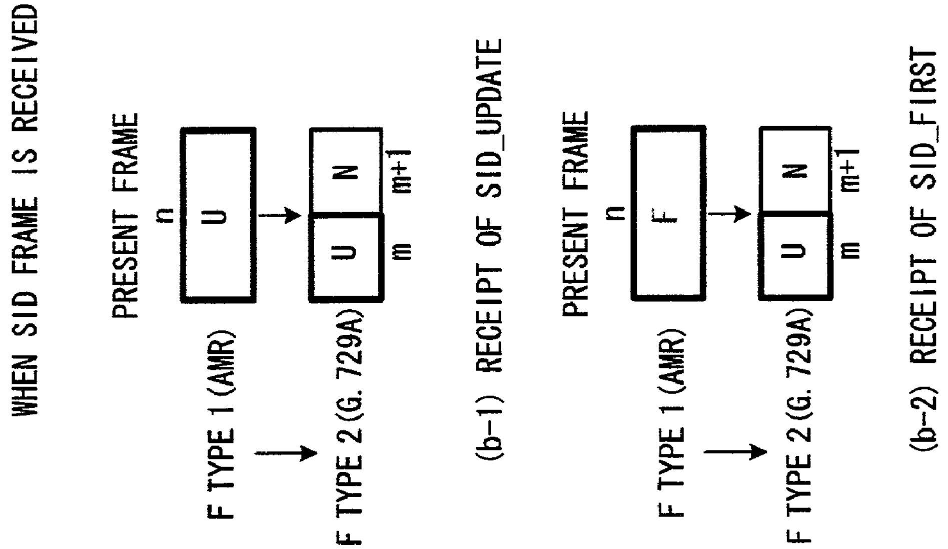
Figure 4C:
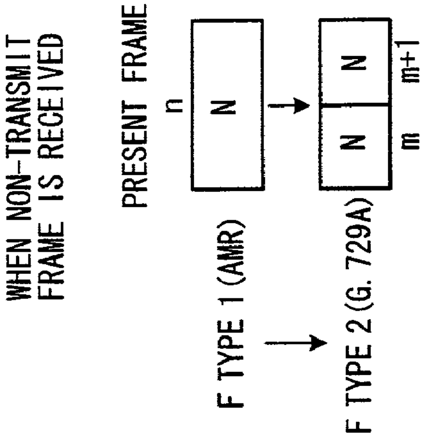

In CN-transcoding control, it is necessary to take into consideration the difference in frame lengths between AMR and G.729A. As shown in FIG. 3, the frame length in AMR is 20 ms whereas that in G.729A is 10 ms. Accordingly, conversion processing entails converting one frame (an nth frame) in AMR as two frames [mth and (m+1)th frames] in G.729A. FIGS. 4A to 4C illustrate control procedures for making the transcoding from AMR to G.729A frame type. These procedures will now be described in order.

(a) In case of Ftype1(n)=SPEECH (receipt of a speech activity frame)

If Ftype1(n)=SPEECH holds, as shown in FIG. 4A, the control switches S1, S2 in FIG. 2 are switched over to terminal 2 and transcoding processing is executed by the speech transcoder 70.

(b) In case of Ftype1(n)=SID_UPDATE (receipt of SID frame)

Figure 23:
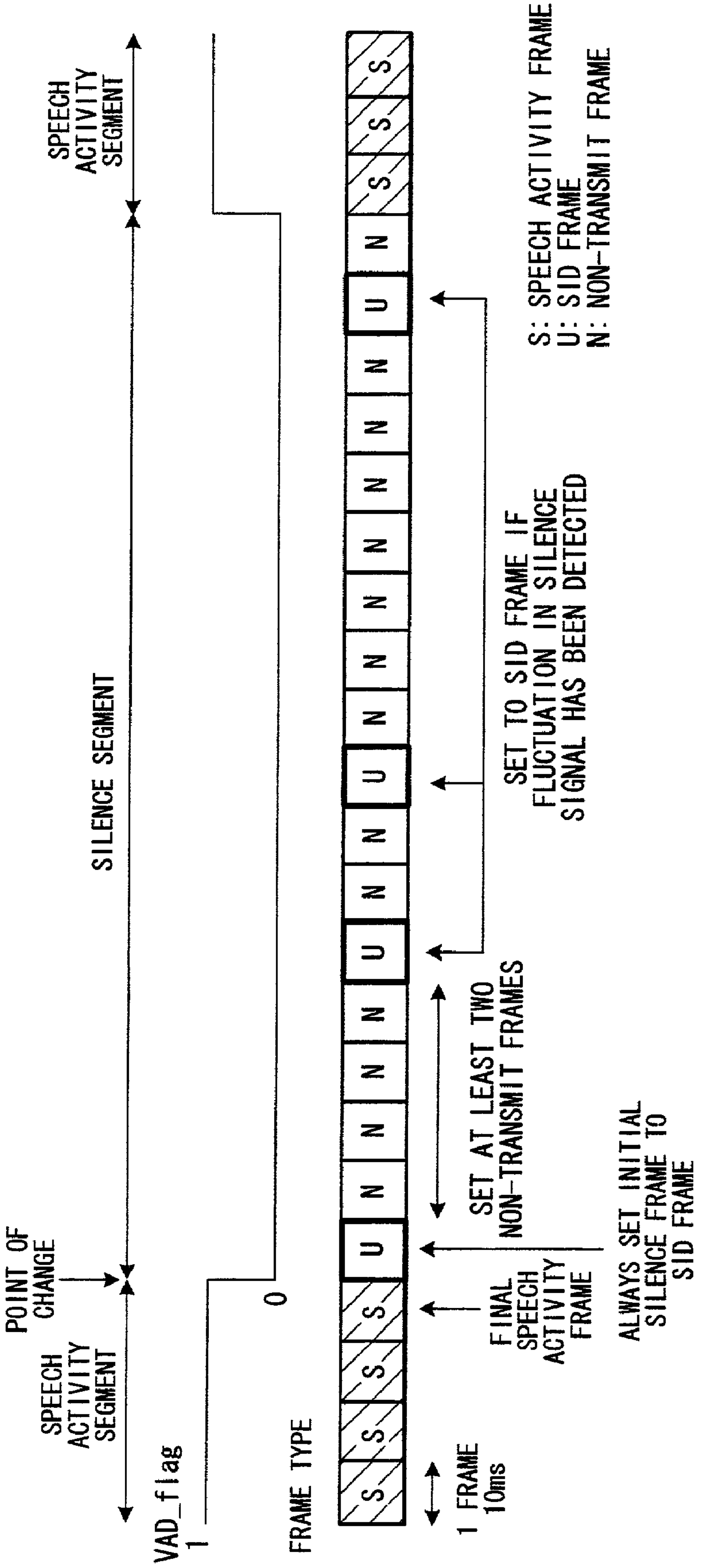
FIG. 23 PRIOR ART
FIG. 23 is a diagram useful in describing DTX control according to G.729A.

Operation when Ftype1(n)=SID_UPDATE holds will now be described. If one frame in AMR is an SID_UPDATE frame, as shown in FIG. 4B, an mth frame in G.729A is set as an SID frame and CN-transcoding processing is executed. Specifically, the switches in FIG. 2 are switched to terminal 3 and silence-code transcoder 60 transcodes CN code bst1(n) in the AMR scheme to an mth frame of CN code bst2(m) in the G.729A scheme. Since SID frames are not set successively in the G.729A scheme, as described above with reference to FIG. 23, the (m+1)th frame, which is the next frame, is set as a non-transmit frame. The operation of each CN element code converter (LSP transcoder $62_1$ and frame power transcoder $62_2$) will be described later.

First, when the CN code bst1(n) enters the code demultiplexer 61, the latter demultiplexes the CN code bst1(n) into LSP code I_LSP1(n) and frame power code I_POW1(n), inputs I_LSP1(n) to an LSP dequantizer 81, which has a quantization table the same as that of the AMR scheme, and inputs I_POW1(n) to a frame power dequantizer 91, which has a quantization table the same as that of the AMR scheme.

The LSP dequantizer 81 dequantizes the entered LSP code I_LSP1(n) and outputs an LSP parameter LSP1(n) in the AMR scheme. That is, the LSP dequantizer 81 inputs the LSP parameter LSP1(n), which is the result of dequantization, to an LSP quantizer 82 as an LSP parameter LSP2(m) of an mth frame of the G.729A scheme. The LSP quantizer 82 quantizes LSP2(m) and outputs LSP code I_LSP2(m) of the G.729A scheme. Though the LSP quantizer 82 may employ any quantization method, the quantization table used is the same as that used in the G.729A scheme.

The frame power dequantizer 91 dequantizes the entered frame power code I_POW1(n) and outputs a frame power parameter POW1(n) in the AMR scheme. The frame power parameters in the AMR and G.729A schemes involve different signal domains when frame power is calculated, with the signal domain being the input signal in the AMR scheme and the LPC residual-signal domain in the G.729A scheme, as indicated in Table 1. Accordingly, in accordance with a procedure described later, a frame power correction unit 92 corrects POW1(n) in the AMR scheme to the LSP residual-signal domain in such a manner that it can be used in the G.729A scheme. The frame power correction unit 92, whose input is POW1(n), outputs a frame power parameter POW2(m) in the G.729A scheme. A frame power quantizer 93 quantizes POW2(m) and outputs frame power code I_POW2(m) in the G.729A scheme. Though the frame power quantizer 93 may employ any quantization method, the quantization table used is the same as that used in the G.729A scheme.

The code multiplexer 63 multiplexes I_LSP2(m) and I_POW2(n) and outputs the multiplexed signal as CN code bst2(m) in the G.729A scheme.

The (m+1)th frame is set as a non-transmit frame and, hence, conversion processing is not executed with regard to this frame. Accordingly, bst2(m+1) includes only frame-type information indicative of the non-transmit frame.

(c) In case of Ftype1(n)=NO_DATA

Next, if frame-type data Ftype1(n)=NO_DATA holds, both the mth and (m+1)th frames are set as non-transmit frames, as shown in FIG. 4C. In this case, transcoding processing is not executed and bst2(m), bst2(m+1) contain only frame-type information indicative of a non-transmit frame.

(d) Method of correcting frame power

Logarithmic power POW1 according to the G.729A scheme is calculated on the basis of the following equation:

$$POW1 = 20\log_{10} E1 \quad (1)$$

where the following holds:

$$E1 = \sqrt{\frac{1}{N_1}\sum_{n=0}^{N_1-1} err(n)^2} \quad (2)$$

Here err(n) (n=0, . . . , $N_1-1$, $N_1$: frame length (80 samples) according to G.729A) represents the LPC residual signal. This is found in accordance with the following equation using the input signal s(n) (n=0, . . . , $N_1-1$) and an LPC coefficient $\alpha_i$ (i=1, . . . , 10) obtained from s(n):

$$err(n) = s(n) + \sum_{i=1}^{10} \alpha_i s(n-i) \tag{3}$$

On the other hand, logarithmic power POW2 in the AMR scheme is calculated on the basis of the following equation:

$$POW2 = \log_2 E2 \tag{4}$$

$$E2 = \sqrt{\frac{1}{N_2}\sum_{n=0}^{N_2-1} sn(n)^2} \tag{5}$$

where N2 represents the frame length (160 samples) in the AMR scheme.

As should be evident from Equations (2) and (5), the G.729A and AMR schemes use signals of different domains, namely residual err(n) and input signal s(n), in order to calculate the powers E1 and E2, respectively. Accordingly, a power correction unit for making a conversion between the two is necessary. Though there is no single specific method of making this correction, the methods set forth below are conceivable.

Correction from G.729A to AMR

Figure 5A:
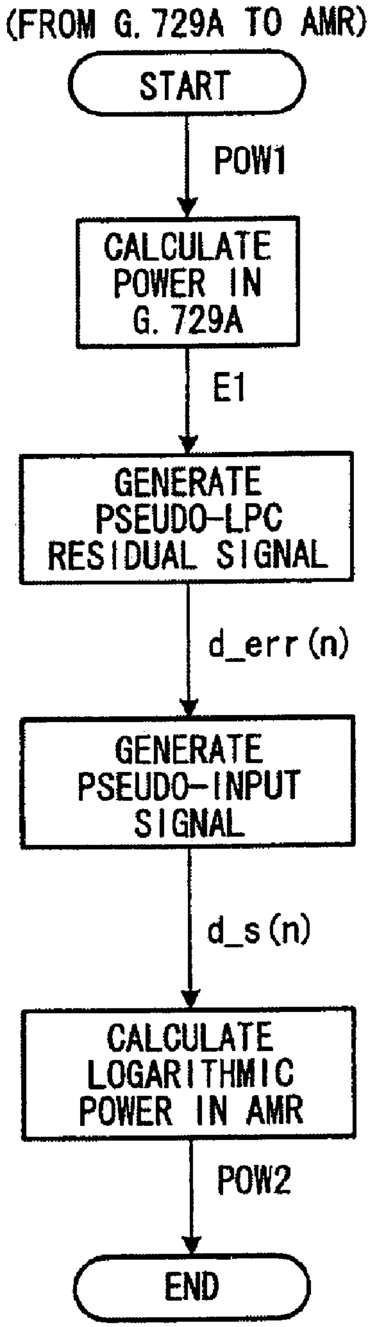
FIGS. 5A and 5B are flowcharts of processing by a power correction unit.

FIG. 5A illustrates the flow of processing for this correction. The first step is to find power E1 from logarithmic power POW1 in the G.729A scheme. This is done in accordance with the following equation:

$$E1=10^{(POW1/20)} \tag{6}$$

The next step is to generate a pseudo-LPC residual signal d_err(n) (n=0, . . . , $N_1-1$) in accordance with the following equation so that power will become E1:

$$d\_err(n)=E1\cdot q(n) \tag{7}$$

where q(n) (n=0, . . . , $N_1-1$) represents random noise in which power has been normalized to 1. The signal d_err(n) is passed through an LPC synthesis filter to produce a pseudo-signal (input-signal domain) d_s(n) (n=0, . . . , $N_1-1$).

$$d\_s(n) = d\_err(n) - \sum_{i=1}^{10} \alpha_i d\_s(n-i) \tag{8}$$

where $\alpha_i$ (i=1, . . . , 10) represents an LPC parameter in G.729A found from the LSP dequantized value. It is assumed that the initial value of d_s(−i) (i=1, . . . , 10) is 0. The power of d_s(n) is calculated and is used as power E1 in the AMR scheme. Accordingly, logarithmic power POW2 in AMR is found by the following equation:

$$POW2 = \log_2\sqrt{\frac{1}{N_1}\sum_{n=0}^{N_1-1} d\_s(n)^2} \tag{9}$$

Correction from AMR to G.729A

Figure 5B:
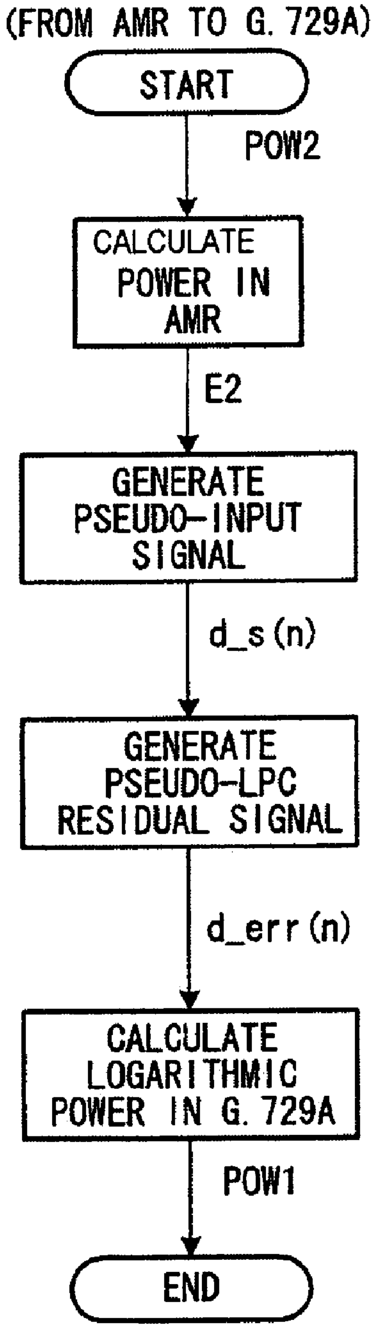

FIG. 5B illustrates the flow of processing for this correction. The first step is to find power E2 from logarithmic power POW2 in the AMR scheme. This is done in accordance with the following equation:

$$E2=2^{POW2} \tag{10}$$

The next step is to generate a pseudo-input signal d_s(n) (n=0, . . . , $N_2-1$) in accordance with the following equation so that power will become E2:

$$d\_s(n)=E2\cdot q(n) \tag{11}$$

where q(n) represents random noise in which power has been normalized to 1. The signal d_s(n) is passed through an LPC inversion synthesis filter to produce a pseudo-signal (LPC residual-signal domain) d_err(n) (n=0, . . . , $N_2-1$).

$$d\_err(n) = d\_s(n) + \sum_{i=1}^{10} \alpha_i d\_s(n-i) \tag{12}$$

where $\alpha_i$ (i=1, . . . , 10) represents an LPC parameter in AMR found from the LSP dequantized value. It is assumed that the initial value of d_s(−i) (i=1, . . . , 10) is 0. The power of d_err(n) is calculated and is used as power E1 in the G.729A scheme. Accordingly, logarithmic power POW1 in G.729A is found by the following equation:

$$POW1 = 20\log_{10}\sqrt{\frac{1}{N_2}\sum_{n=0}^{N_2-1} d\_err(n)^2} \tag{13}$$

(e) Effects of the first embodiment

In accordance with the first embodiment, as described above, LSP code and frame power code, which constituted the CN code in the AMR scheme, can be transcoded to CN code in the G.729A scheme. Further, by switching between the speech transcoder 70 and the silence-code transcoder 60, code data (speech activity code and silence code) from an AMR scheme having a silence compression function can be transcoded normally to code data of a G.729A scheme having a silence compression function without once decoding the code data to decoding speech.

(C) Second Embodiment

Figure 6:
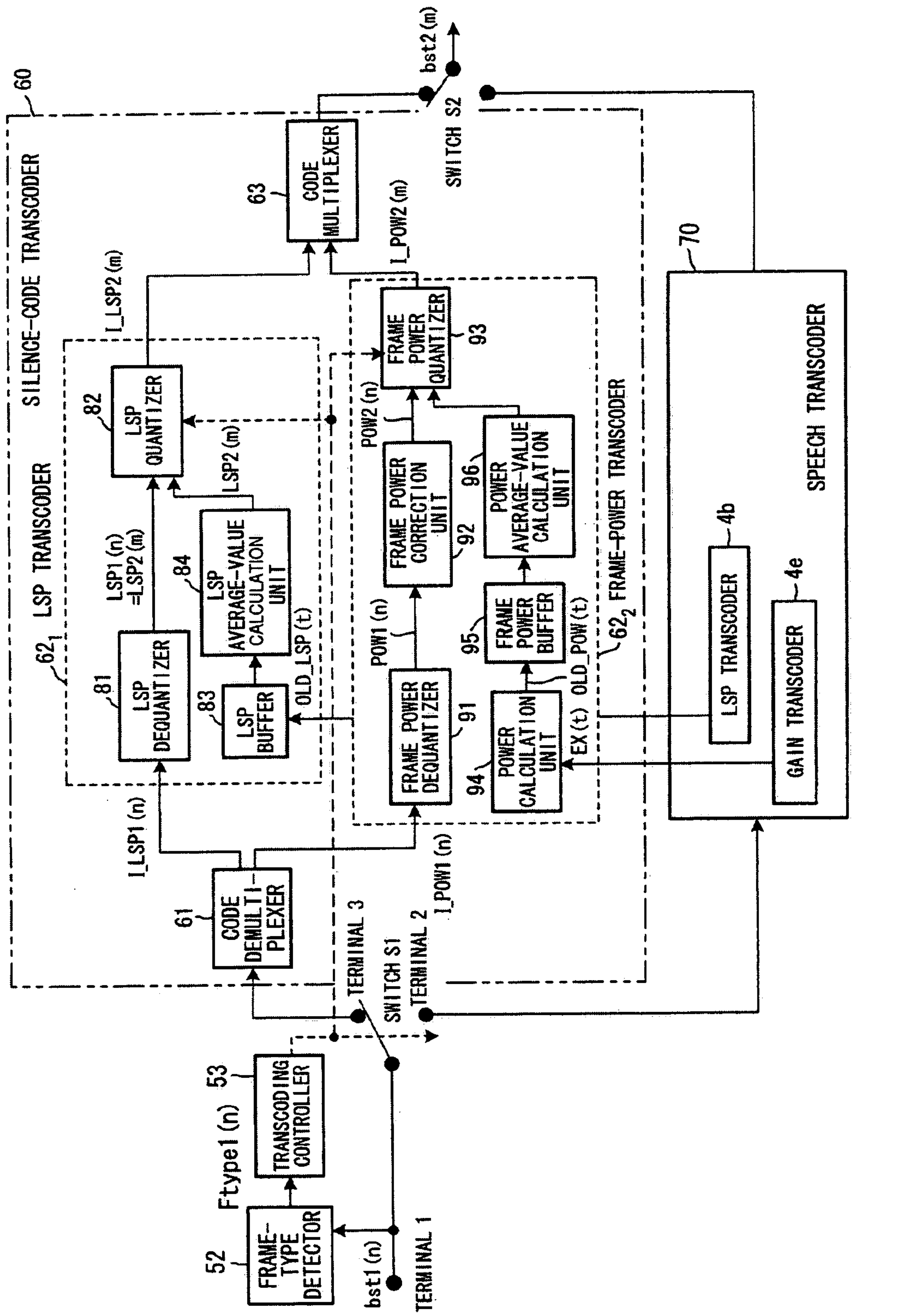
FIG. 6 is a block diagram according to a second embodiment of the present invention.

FIG. 6 is a block diagram of a second embodiment of the present invention, in which components identical with those of the first embodiment shown in FIG. 2 are designated by like reference characters. As in the first embodiment, the second embodiment adopts AMR as encoding scheme 1 and G.729A as encoding scheme 2. In this instance, conversion processing for a case where the frame type Ftype1(n) of the AMR scheme detected by the frame-type detector 52 is SID_FIRST is executed.

In this case also where one frame in the AMR scheme is an SID_FIRST frame, conversion processing is executed upon setting the mth frame and (m+1)th frame of the G.729A scheme as an SID frame and non-transmit frame respectively, as shown in (b-2) of FIG. 4B, in a manner similar to the case where the AMR frame is an SID_UPDATE frame [(b-1) in FIG. 4B] in the first embodiment. However, in the case of an SID_FIRST frame in the AMR scheme, it is necessary to take into account the fact that CN code is not being sent owing to hangover control, as described above with reference to FIG. 25. In other words, bst1(n) is not sent and therefore does not arrive. Therefore, with the composition of the first embodiment shown in FIG.

2, LSP2(m) and POW2(m), which are CN parameters in the G.729A scheme, cannot be obtained.

Accordingly, in the second embodiment, these parameters are calculated using the last seven speech activity frames that were sent immediately before the SID_FIRST frame. The conversion processing will now be described.

Figure 17:
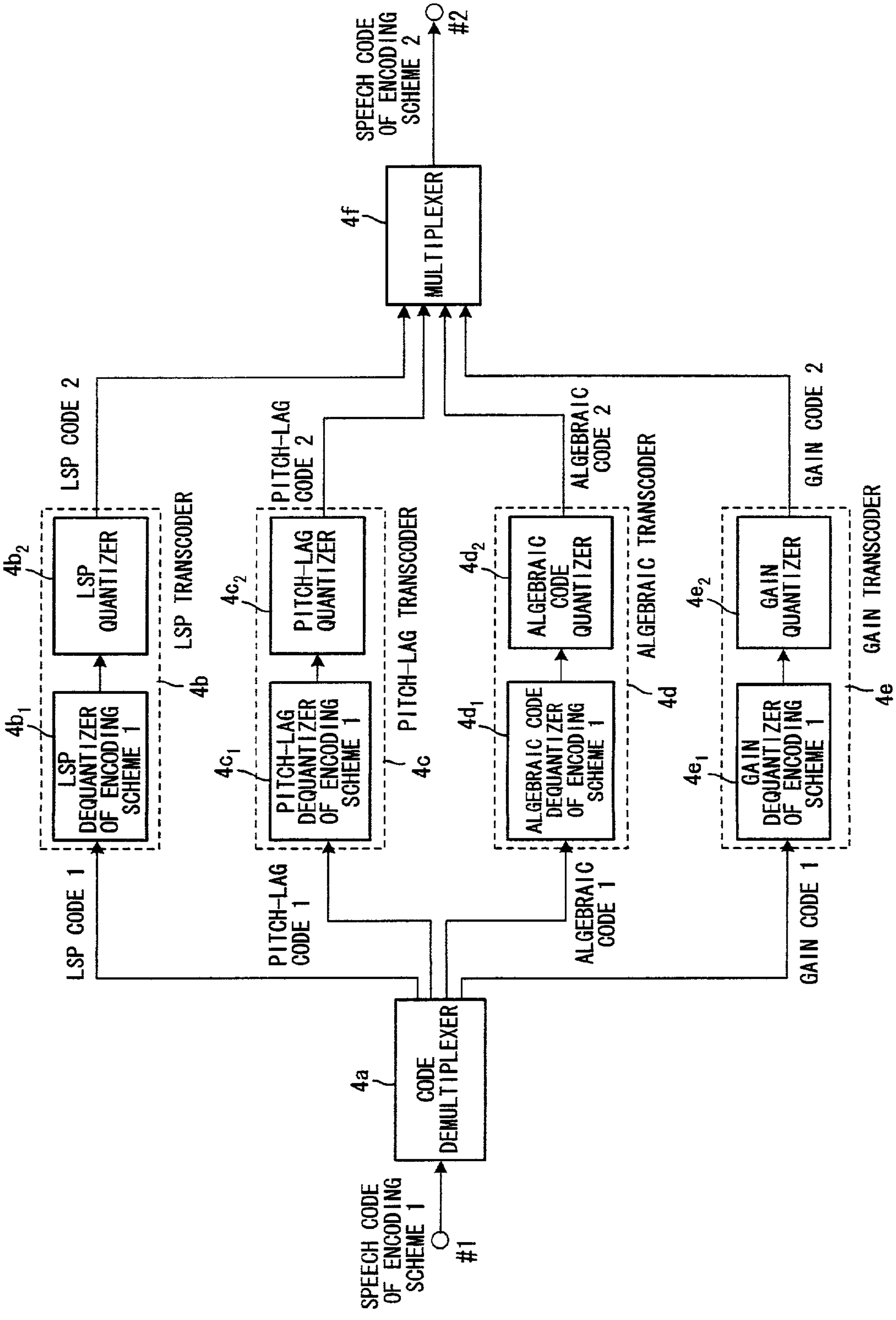
FIG. 17 PRIOR ART
FIG. 17 is a diagram for describing prior art 2 in greater detail.
Figure 18:
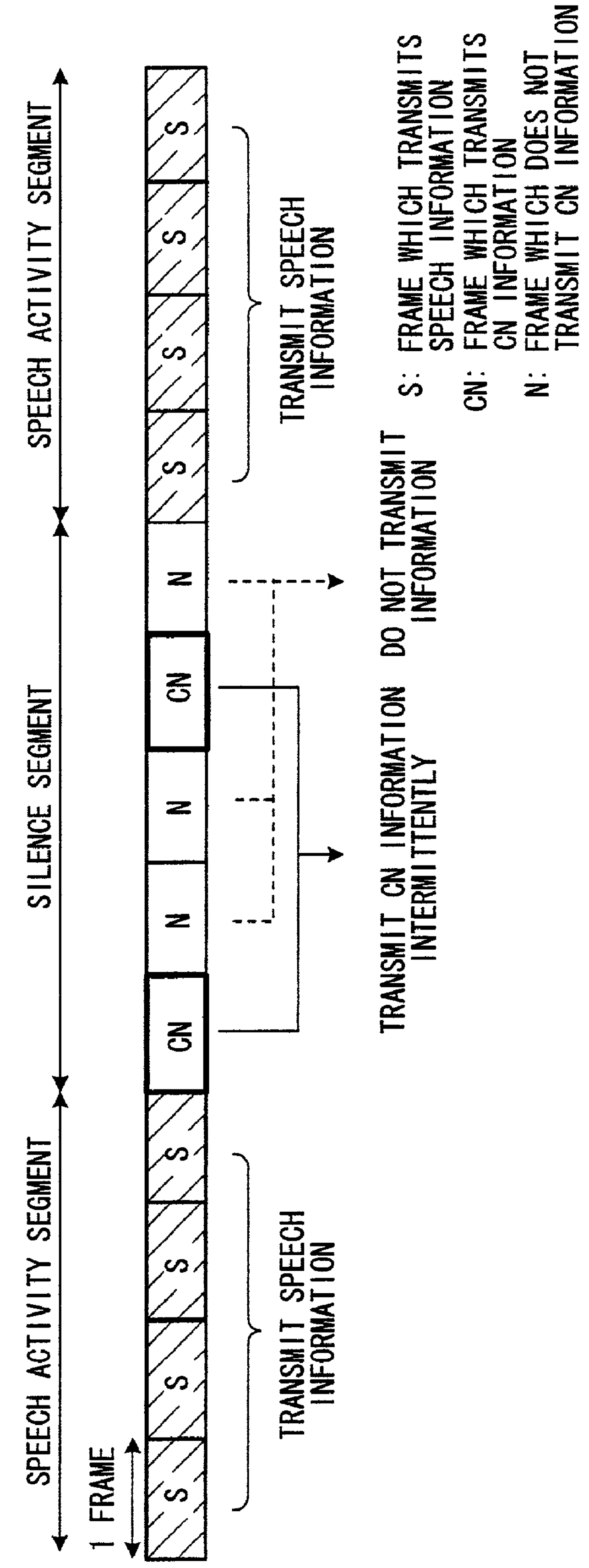
FIG. 18 PRIOR ART
FIG. 18 is a conceptual view of a silence compression function according to the prior art.
Figure 19:
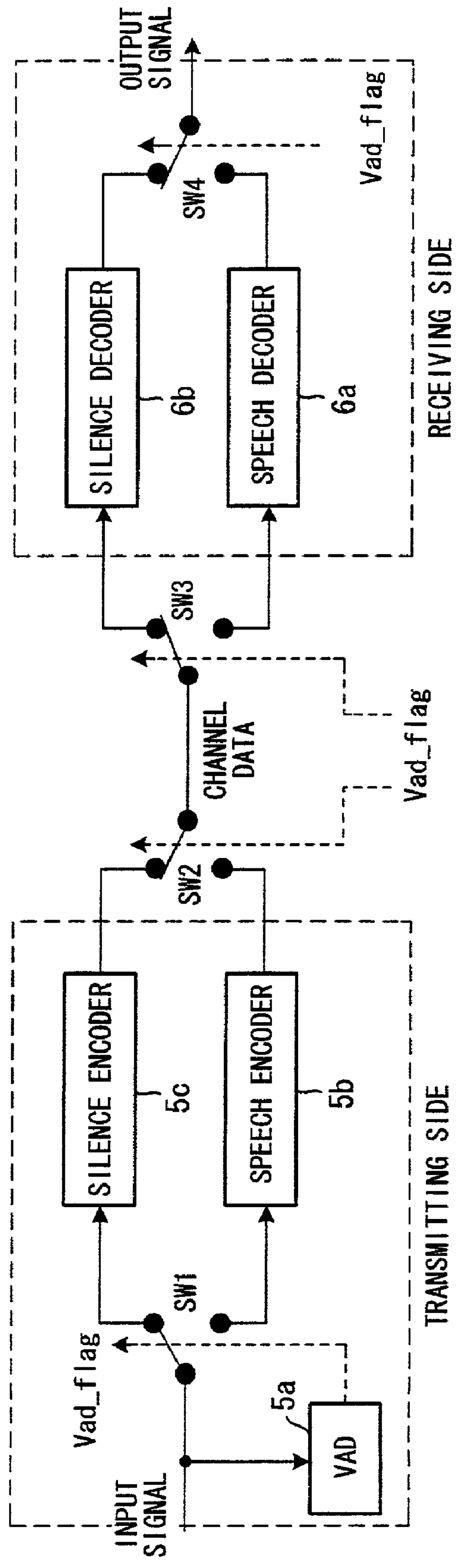
FIG. 19 PRIOR ART
FIG. 19 is a diagram illustrating the principle of a silence compression function according to the prior art.
Figure 20:
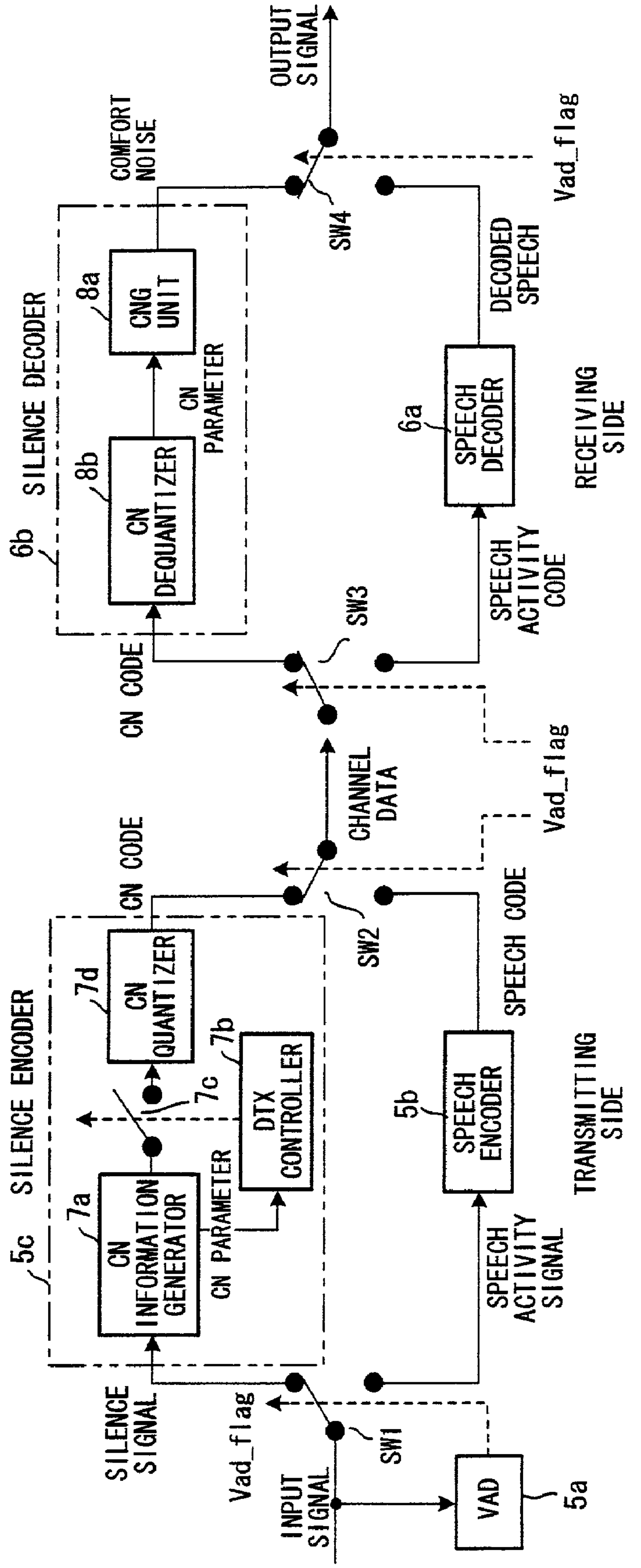
FIG. 20 PRIOR ART
FIG. 20 is a processing block diagram of the silence compression function according to the prior art.
Figure 21B:
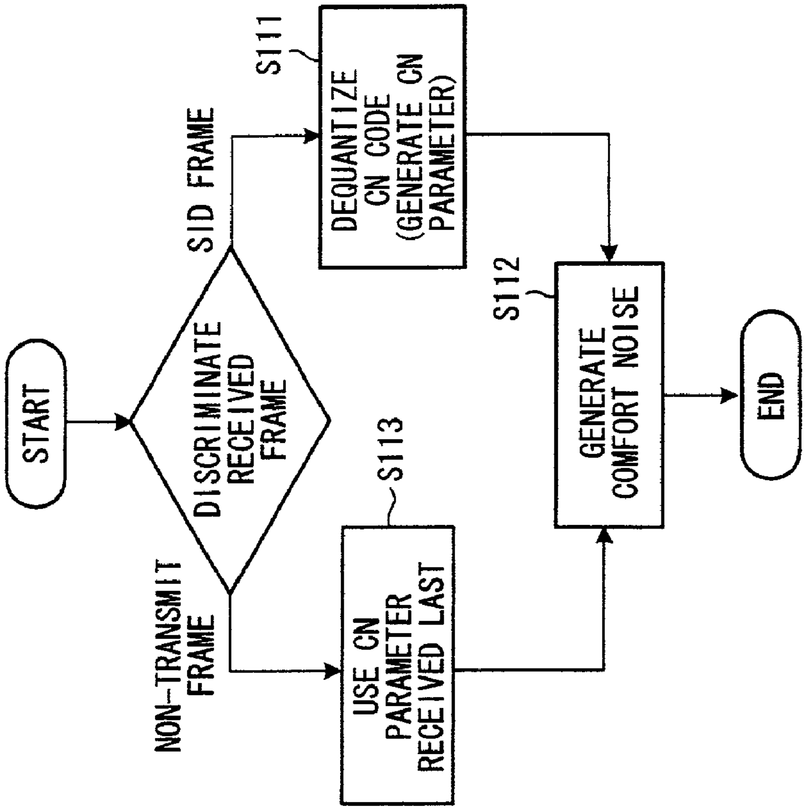
FIG. 21B PRIOR ART
FIGS. 21A and 21B are processing flowcharts of the silence compression function according to the prior art.
Figure 21A:
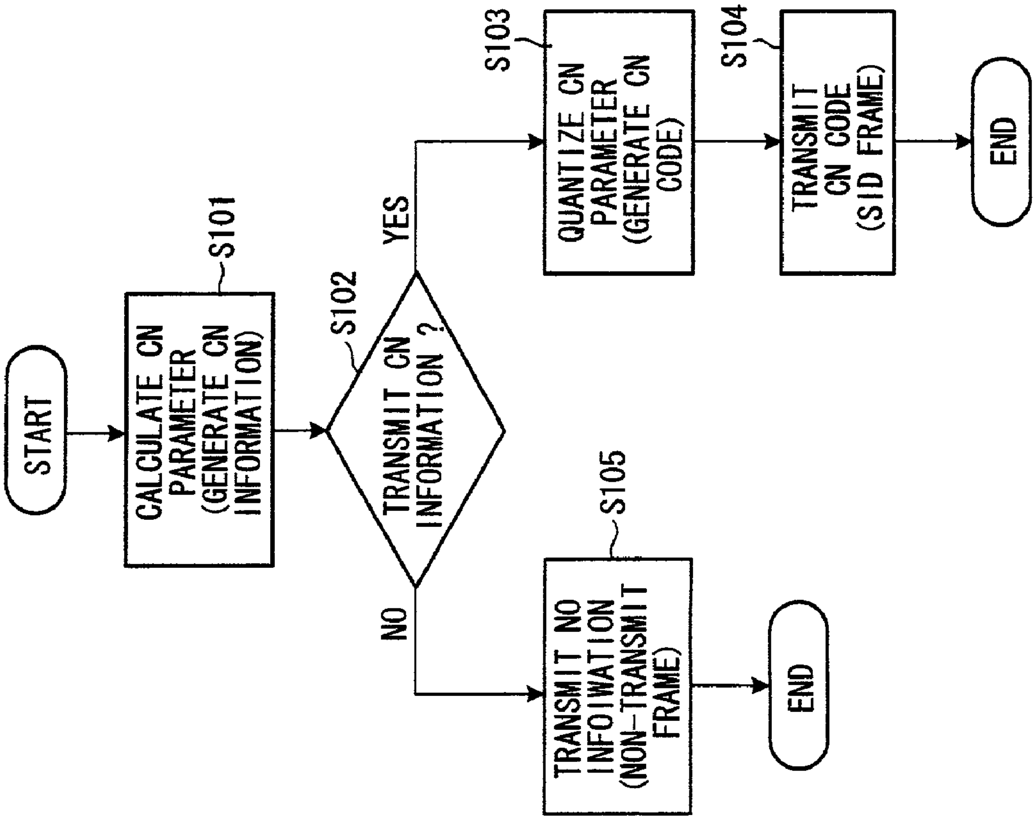
FIG. 21A PRIOR ART
Figure 22A:
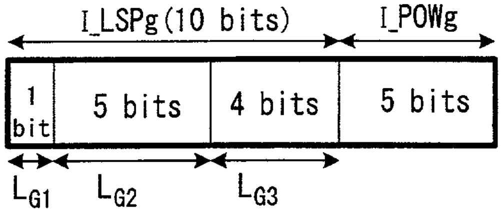
FIG. 22A PRIOR ART
FIGS. 22A and 22B are diagrams showing the structure of silence code according to the prior art.
Figure 22B:
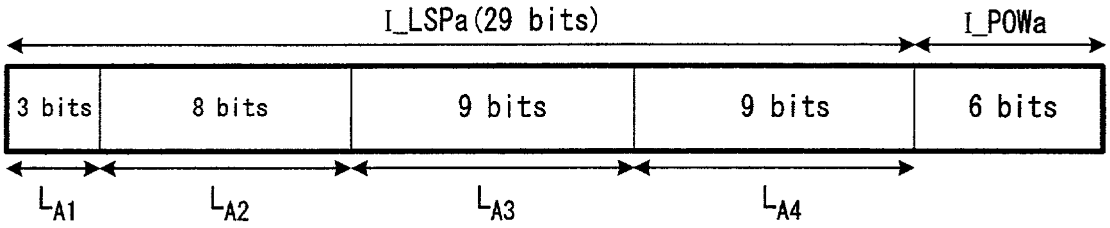
FIG. 22B PRIOR ART

As mentioned above LSP2(m) in the SID_FIRST frame is calculated as an average value of the last seven frames of LSP parameters OLD_LSP(1), (l=n−1, n−7) output from the LSP dequantizer $4b_1$ (see FIG. 17) of LSP code converter 4*b* in the speech transcoder 70. Accordingly, an LSP buffer unit 83 always holds the LSP parameters of the last seven frames with respect to the present frame, and an LSP average-value calculation unit 84 calculates and holds the average value of LSP parameters OLD_LSP(1), (l=n−1, n−7) of the last seven frames.

Similarly, POW2(m) also is calculated as an average value of the last seven frames of frame power OLD_POW (1), (l=n−1, n−7). OLD_POW(1) is obtained as the frame power of a speech-source signal EX(1) produced by the gain code converter 4*e* (see FIG. 17) in speech transcoder 70. Accordingly, a power calculation unit 94 calculates frame power of the speech-source signal EX(1), a frame power buffer 95 always holds frame power OLD_POW(1) of the last seven frames with respect to the present frame, and a power average-value calculation unit 96 calculates and holds the average value of frame power OLD_POW(1) of the last seven frames.

If the frame type in a silence segment is not SID_FIRST, the LSP quantizer 82 and frame power quantizer 93 are so notified by the transcoding controller 53 and therefore obtain and output the LSP code I_LSP2(m) and frame power code I_POW2(m) using the LSP parameter and frame power parameter output from the LSP dequantizer 81 and frame power dequantizer 91.

However, if the frame type in a silence segment is SID_FIRST, i.e., if Ftype1(n)=SID_FIRST holds in a silence segment, this is reported by the transcoding controller 53. In response, the LSP quantizer 82 and frame power quantizer 93 obtain and output the LSP code I_LSP2(m) and frame power code I_POW2(m), respectively, of the G.729A scheme using the average LSP parameter and average frame power parameter of the last seven frames being held by the LSP average-value calculation unit 84 and power average-value calculation unit 96, respectively.

The code multiplexer 63 multiplexes the LSP code I_LSP2(m) and frame power code I_POW2(m) and outputs the multiplexed signal as bst2(m).

Further, conversion processing is not executed with regard to the (m+1)th frame and only frame-type information indicative of a non-transmit frame is included in bst2 (m+1) and sent.

Thus, in accordance with the second embodiment, as described above, even if CN code to be transcoded is not obtained owing to hangover control in the AMR scheme, a CN parameter is obtained utilizing speech parameters of past speech activity frames and CN code according to G.729A can be produced.

(C) Third Embodiment

Figure 7:
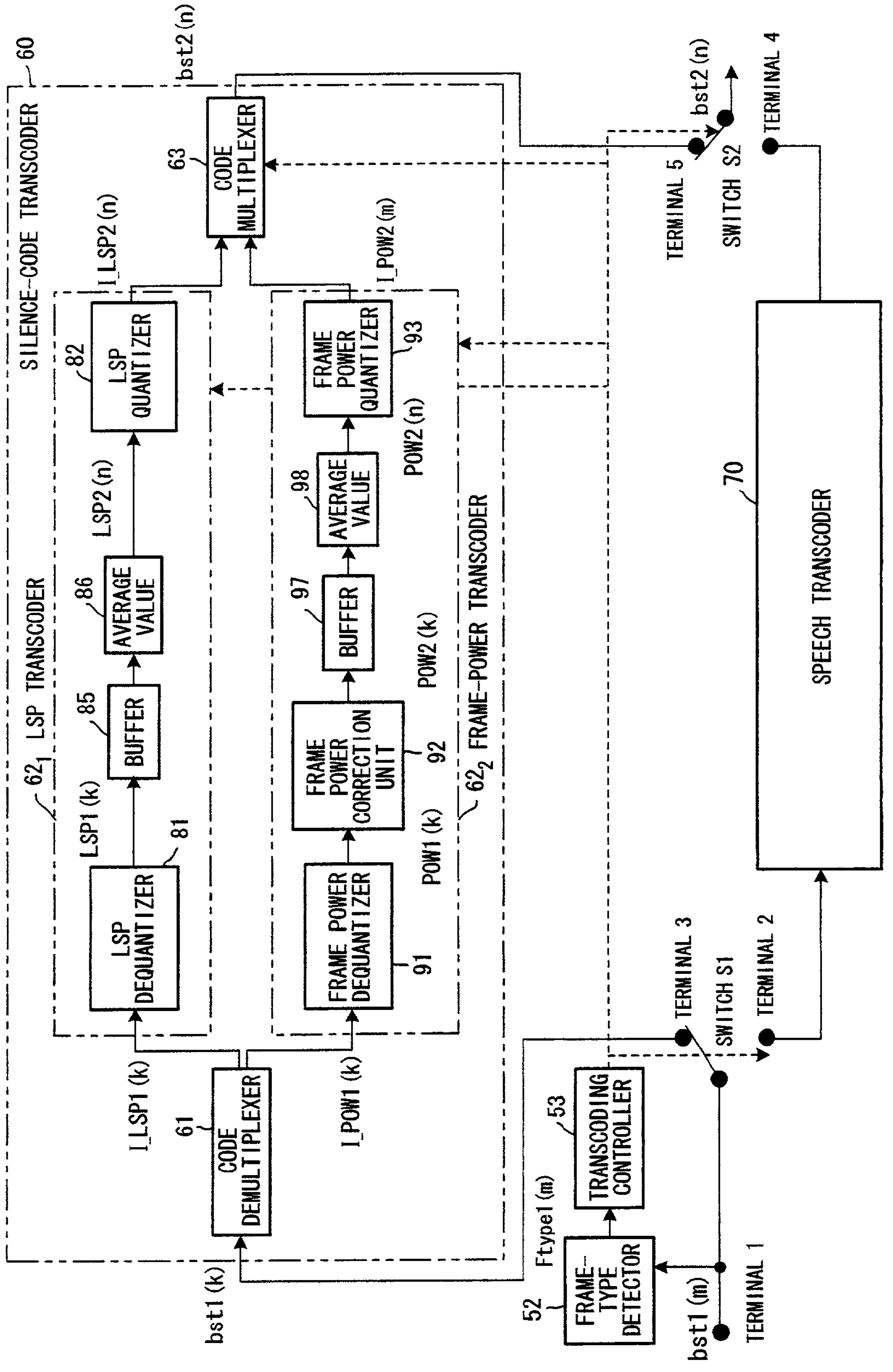
FIG. 7 is a block diagram according to a third embodiment of the present invention.

FIG. 7 is a block diagram of a third embodiment of the present invention, in which components identical with those of the first embodiment are designated by like reference characters. The third embodiment illustrates an example in which G.729A is used as encoding scheme 1 and AMR as encoding scheme 2. In FIG. 7, an mth frame of channel data, bst1(m) i.e., speech code, enters terminal 1 from a G.729A encoder (not shown). The frame-type detector 52 extracts frame-type information Ftype(m) contained in bst1(m) and outputs this information to the transcoding controller 53. Frame-type information Ftype(m) in the G.729A scheme is of three kinds, namely speech activity frame (SPEECH), SID frame (SID) and non-transmit frame (NO_DATA) (see FIG. 23). The transcoding controller 53 changes over the switches S1, S2 upon identifying speech activity segments and silence segments based upon frame type.

The silence-code transcoder 60 executes CN-transcoding processing in accordance with frame-type information Ftype (m) in a silence segment. Accordingly, it is necessary to take into consideration the difference in frame lengths between AMR and G.729A, just as in the first embodiment. That is, two frames [mth and (m+1)th frames] in G.729A are converted as one frame (an nth frame) in AMR. In the conversion from G.729A to AMR, it is necessary to control conversion processing taking the difference of DTX control into consideration.

Figure 8:
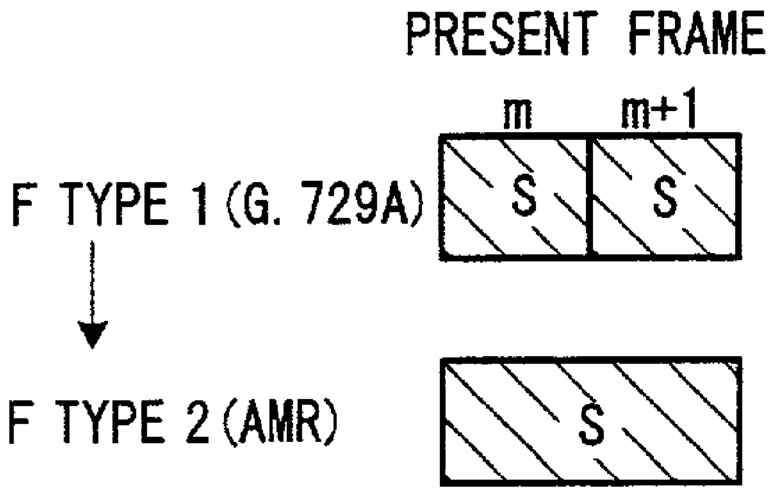
FIG. 8 show control procedures for conversion of frame type from G.729A to AMR.

If Ftype1(m), Ftype1(m+1) are both speech activity frames (SPEECH), as shown in FIG. 8, the nth frame in the AMR scheme also is set as a speech activity frame. In other words, the control switches S1, S2 in FIG. 7 are switched to terminals 2, 4, respectively, and the speech transcoder 70 executes transcoding of speech code in accordance with prior art 2.

Figure 9:
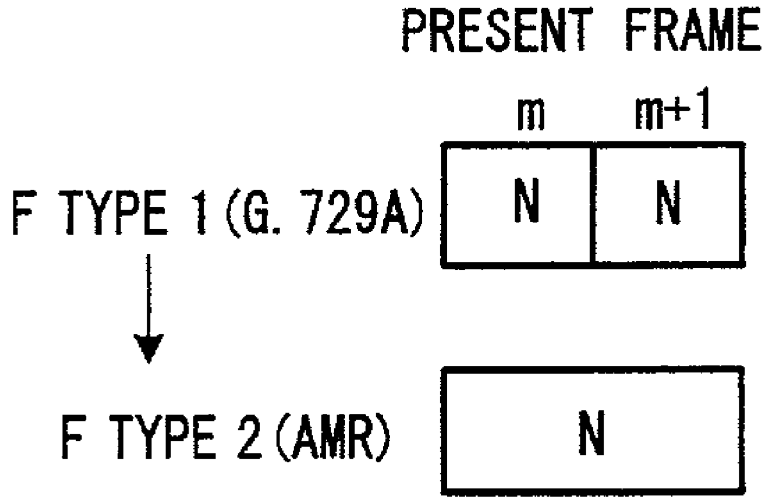
FIG. 9 show control procedures for conversion of frame type from G.729A to AMR.

Further, if Ftype1(m), Ftype1(m+1) are both non-transmit frames (NO_DATA), as shown in FIG. 9, the nth frame in the AMR scheme also is set as a non-transmit frame and transcoding processing is not executed. In other words, the control switches S1, S2 in FIG. 7 are switched to terminals 3, 5, respectively, and the code multiplexer 63 output only frame-type information in the non-transmit frame. Accordingly, only frame-type information indicative of the non-transmit frame is included in bst2(n).

Figure 10:
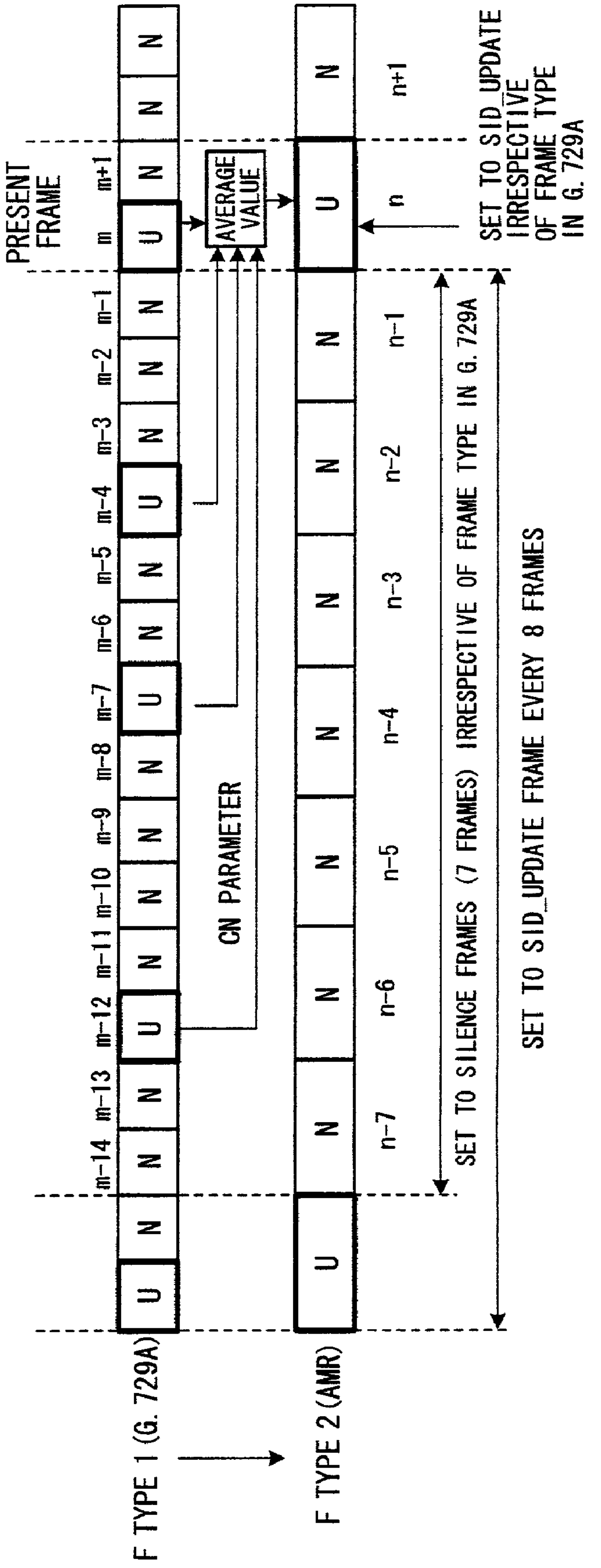
FIG. 10 is a diagram useful in describing conversion control (AMR conversion control every eight frames) in a silence segment.

A method of converting CN code in a silence segment as shown in FIG. 10 will now be described. FIG. 10 illustrates the temporal flow of the CN transcoding method in a silence segment. In the silence segment, the switches S1, S2 of FIG. 7 are switched to terminals 3, 5, respectively, and the silence-code transcoder 60 executes processing for transcoding CN code. It is necessary to take the dissimilarity in DTX control between the G.729A and AMR schemes into account in this transcoding processing. Control for transmitting an SID frame in G.729A is adaptive, and SID frames are set at irregular intervals in dependence upon a fluctuation in the CN information (silence signal). In the AMR scheme, on the other hand, an SID frame (SID_UPDATE) is set periodically, i.e., every eight frames. In the silence segment, therefore, as shown in FIG. 10, transcoding is made to an SID frame (SID_UPDATE) every eight frames (which corresponds to 16 frames in the G.729A scheme) in conformity with the AMR scheme, to which the transcoding is to be made, irrespective of the frame type (SID or NO_DATA) of the G.729A scheme from which the transcoding is made. Further, the transcoding is performed in such a manner that the other seven frames make up non-transmit frame (NO_DATA).

More specifically, in the transcoding to an SID_UPDATE frame of an nth frame in the AMR scheme in FIG. 10, an average value is found from CN parameters of SID frames received over the last 16 frames [(m−14)th, . . . , (m+1)th frames] (which correspond to eight frames in the AMR scheme) inclusive of the present frames [mth, (m+1)th frames], and the transcoding is made to a CN parameter of the SID_UPDATE frame in the AMR scheme. The transcoding processing will be described with reference to FIG. 7.

If an SID frame in the G.729A scheme is received in a kth frame, the code demultiplexer 61 demultiplexes CN code bst1(k) into LSP code I_LSP1(k) and frame power code I_POW1(k), inputs I_LSP1(k) to the LSP dequantizer 81, which has the same quantization table as that of the G.729A scheme, and inputs I_POW1(k) to the frame power dequantizer 91 having the same quantization table as that of the G.729A scheme. The LSP dequantizer 81 dequantizes the LSP code I_LSP1(k) and outputs an LSP parameter LSP1(k) in the G.729A scheme. The frame power dequantizer 91 dequantizes the frame power code I_POW1(k) and outputs a frame power parameter POW1(k) in the G.729A scheme.

The frame power parameters in the G.729A and AMR schemes involve different signal domains when frame power is calculated, with the signal domain being the LPC residual-signal domain in the G.729A scheme and the input signal in the AMR scheme, as indicated in Table 1. Accordingly, the frame power correction unit 92 effects a correction to the input-signal domain in such a manner that the parameter POW1(k) of the LSP residual-signal domain in G.729A can be used in the AMR scheme. As a result, the frame power correction unit 92, whose input is POW1(k), outputs a frame power parameter POW2(k) in the AMR scheme.

The parameters LSP1(k), POW2(k) found are input to buffers 85, 97, respectively. The CN parameters of SD frames received over the last 16 frames (k=m−14, . . . , m+1) are held by the buffers 85, 97. If an SID frame is not received over the last 16 frames, the CN parameter of the SID frame that was received last is used.

Average-value calculation units 86, 98 calculate average values of the data held by the buffers 85, 97, respectively, and output these average values as CN parameters LSP2(n), POW2(n), respectively, in the AMR scheme. The LSP quantizer 82 quantizes LSP2(n) and outputs LSP code I_LSP2(n) of the AMR scheme. Though the LSP quantizer 82 may employ any quantization method, the quantization table used is the same as that used in the AMR scheme. The frame power quantizer 93 quantizes POW2(n) and outputs frame power code I_POW2(n) of the AMR scheme. Though the frame power quantizer 93 may employ any quantization method, the quantization table used is the same as that used in the AMR scheme. The code multiplexer 63 multiplexes I_LSP2(n) and I_POW2(n), adds on frame-type information (=U) and outputs the result as bst2(n).

As described above, the third embodiment is such that if, in a silence segment, processing for transcoding of CN code is executed periodically in conformity with DTX control in the AMR scheme, to which the transcoding is to be made, irrespective of the frame type in the G.729A scheme from which the transcoding is made, then the average value of CN parameters in the G.729A scheme received until transcoding processing is executed is used as the CN parameter of the AMR scheme, thereby making it possible to produce CN code in the AMR scheme.

Further, by switching between a speech transcoder and CN code converter, code data (speech activity code and silence code) from a G.729A scheme having a silence compression function can be transcoded normally to code data of an AMR scheme having a silence compression function without once decoding the code data to decoding speech.

(E) Fourth Embodiment

Figure 11:
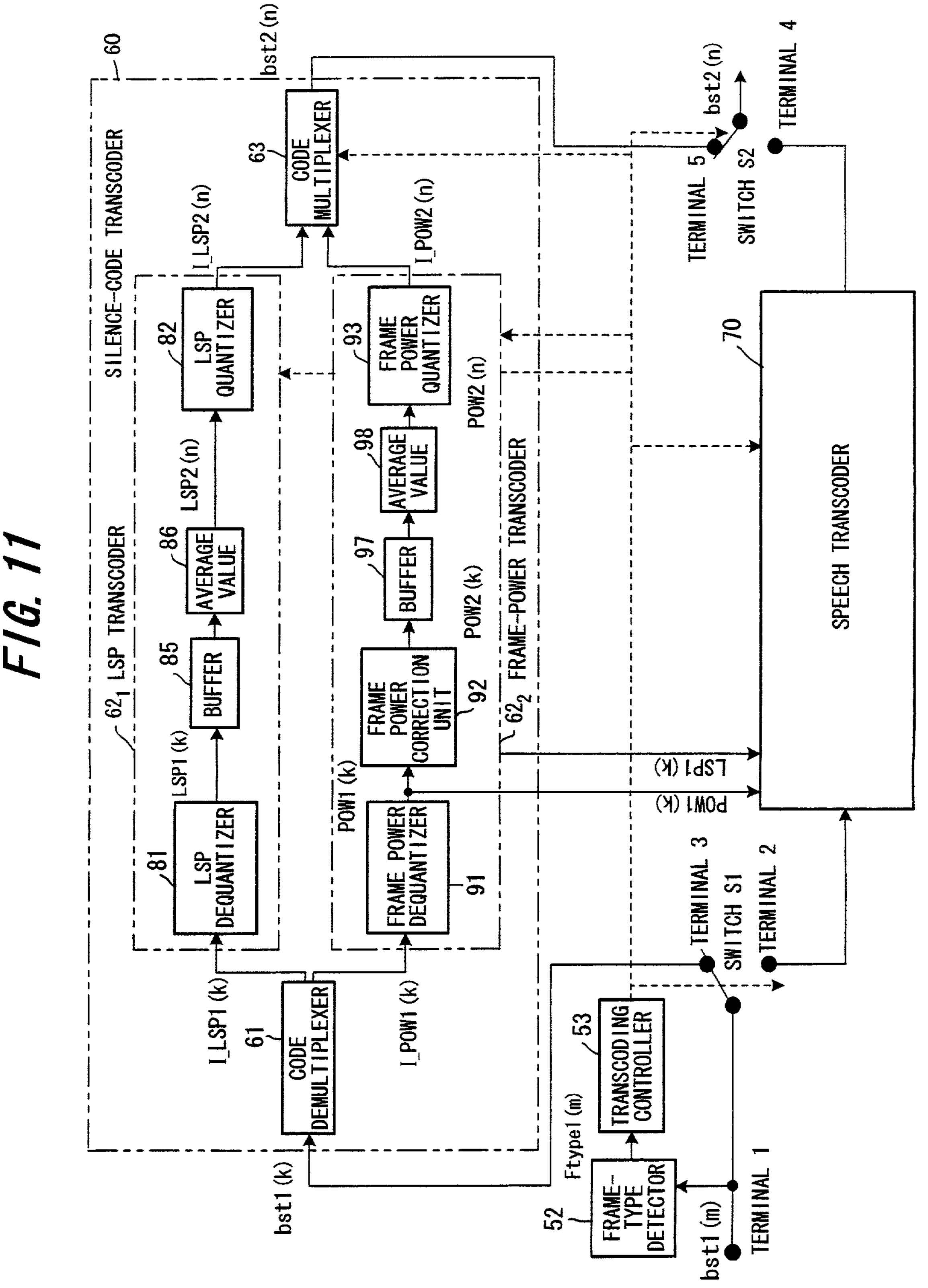
FIG. 11 is a block diagram according to a fourth embodiment of the present invention.
Figure 12:
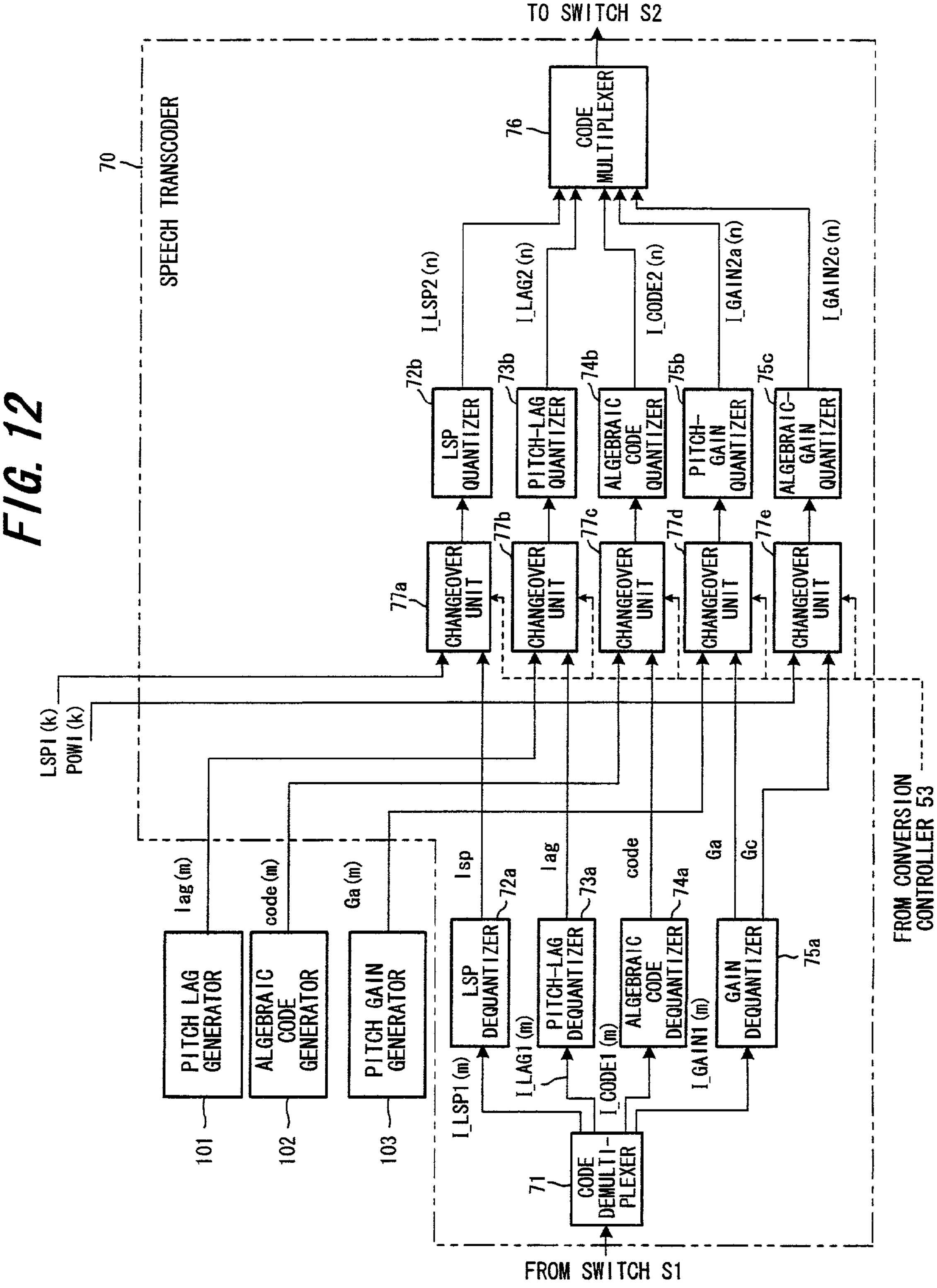
FIG. 12 is a block diagram of a speech transcoder according to the fourth embodiment.

FIG. 11 is a block diagram of a fourth embodiment of the present invention, in which components identical with those of the third embodiment shown in FIG. 7 are designated by like reference characters. FIG. 12 is a block diagram of the speech transcoder 70 according to the fourth embodiment. As in the third embodiment, the fourth embodiment adopts G.729A as encoding scheme 1 and AMR as encoding scheme 2. In this instance, processing for transcoding CN code at a point where there is a change from a speech activity segment to a silence segment is executed.

Figures 13A, 13B:
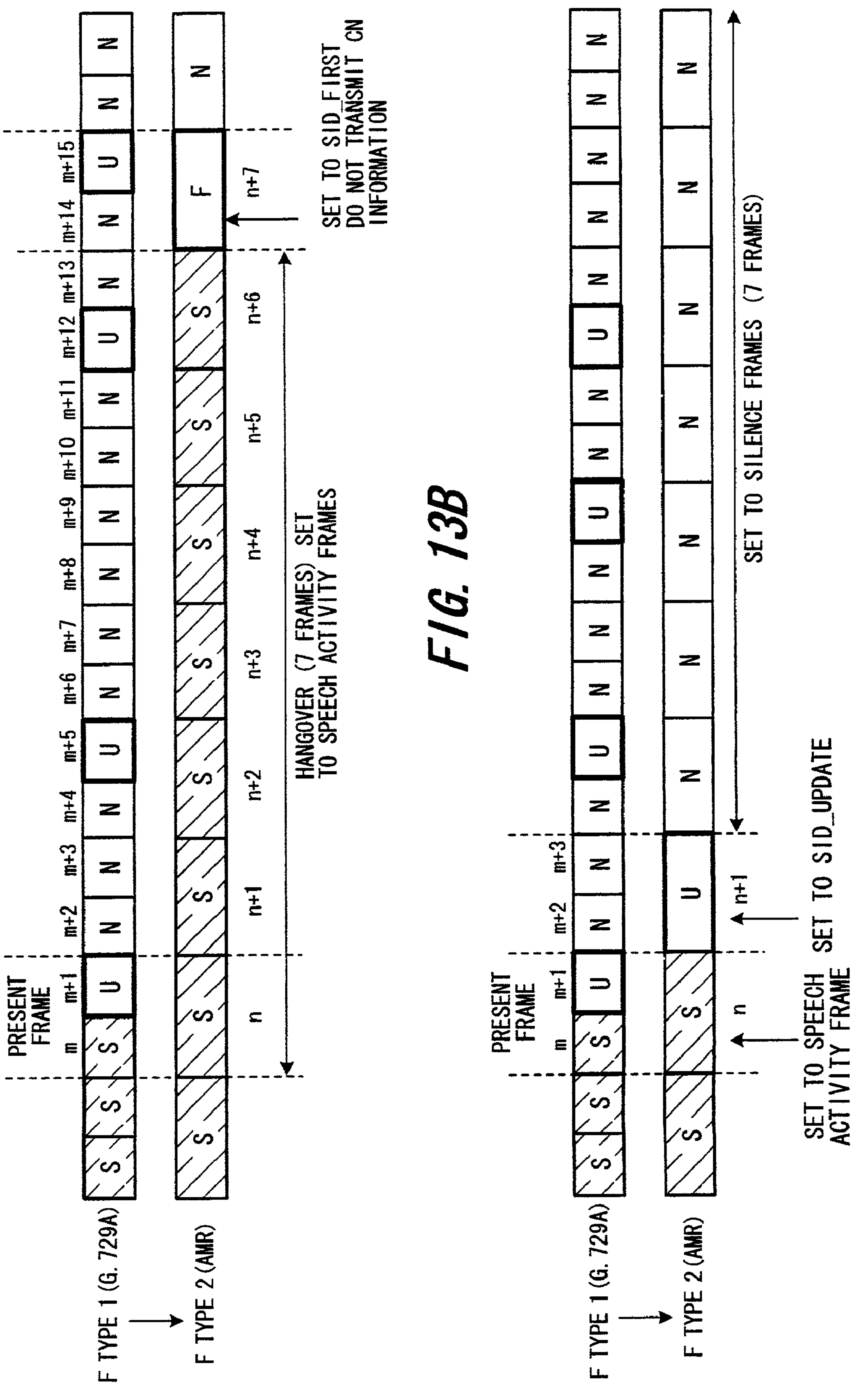
FIGS. 13A and 13B are diagrams useful in describing transcoding control at a point where there is a change from speech activity to silence.

FIGS. 13A and 13B illustrate the temporal flow of the transcoding control method. In a case where mth and (m+1)th frames in the G.729A scheme are speech activity and SID frames, respectively, this indicates a point at which there is a change from a speech activity segment to a silence segment. In AMR, hangover control is carried out at this point of change. Furthermore, if the number of elapsed frames from the last time processing for transcoding to an SID_UPDATE frame was executed to the frame at which the segment changes is 23 or less, hangover control is not carried out. A case where the number of elapsed frames exceeds 23 and hangover control is performed will now be described.

In a case where hangover control is carried out, it is required that seven frames [nth, . . . , (n+6)th frames] from the frame at the point of change be set as speech activity frames despite the fact that these are silence frames. Accordingly, as shown in FIG. 13A, transcoding processing is executed in conformity with DTX control in the AMR scheme, to which the transcoding is to be made, considering (m+1)th to (m+13)th frames in the G.729A scheme as being speech activity frames despite the fact that these are silence frames (SID or non-transmit frames). This transcoding processing will be described with reference to FIGS. 11 and 12.

In order to effect trancoding from a G.729A speech activity frame to an AMR speech activity frame at the point where there is a change from a speech activity segment to a silence segment, only transcoding processing is executed using the speech transcoder 70. From the point of change onward, however, the G.729A side cannot obtain G.729A speech parameters (LSP, pitch lag, algebraic code, pitch gain and algebraic code gain), which constitute the input to speech transcoder 70, because the frames will be silence frames. Accordingly, as shown in FIG. 12, CN parameters LSP1(k), POW1(k) (k<n) last received by the silence-code transcoder 60 are substituted for LSP and algebraic code gain, and a pitch lag generator 101, algebraic code generator 102 and pitch gain generator 103 generate the other parameters [pitch lag lag(m), pitch gain Ga(m) and algebraic code code(m)] freely to a degree that will not result in acoustically unnatural effects. As for the method of generation, these other parameters may be generated randomly or based upon fixed values. With regard to pitch gain, however, it is desired that the minimum value (0.2) be set.

Operation of the speech transcoder 70 in a speech activity segment and when there is a changeover from a speech activity segment to a silence segment will now be described.

In a speech activity segment, a code demultiplexer 71 demultiplexes input speech code of G.729A into LSP code I_LSP1(m), pitch-lag code I_LAG1(m), algebraic code I_CODE1(m) and gain code I_GAIN1(m), and inputs these codes to an LSP dequantizer 72*a*, pitch-lag dequantizer 73*a*, algebraic code dequantizer 74*a* and gain dequantizer 75*a*, respectively. Further, in the speech activity segment, changeover units 77*a* to 77*e* select outputs from the LSP dequantizer 72*a*, pitch-lag dequantizer 73*a*, algebraic code dequantizer 74*a* and gain dequantizer 75*a* in accordance with a command from the transcoding controller 53.

The LSP dequantizer 72*a* dequantizes LSP code in the G.729A scheme and outputs an LSP dequantized value LSP, and an LSP quantizer 72*b* quantizes this LSP dequantized value using an LSP quantization table according to the AMR scheme and outputs LSP code I_LSP2(n). The pitch-lag dequantizer 73*a* dequantizes pitch-lag code in the G.729A scheme and outputs a pitch-lag dequantized value lag, and a pitch-lag quantizer 73*b* quantizes this pitch-lag dequantized value using a pitch-lag quantization table according to the AMR scheme and outputs pitch-lag code I_LAG2(n). The algebraic code dequantizer 74*a* dequantizes algebraic code in the G.729A scheme and outputs an algebraic-code dequantized value code, and an algebraic code quantizer 74*b* quantizes this algebraic-code dequantized value using an algebraic-code quantization table according to the AMR scheme and outputs algebraic code I_CODE2(n). The gain dequantizer 75*a* dequantizes gain code in the G.729A scheme and outputs an algebraic-gain dequantized value Ga and an algebraic-gain dequantized value Gc, and a pitch-gain quantizer 75*b* quantizes this pitch-gain dequantized value Ga using a pitch-gain quantization table according to the AMR scheme and outputs pitch-gain code I_GAIN2*a*(n). Further, an algebraic-gain quantizer 75*c* quantizes the algebraic-gain dequantized value Gc using a gain quantization table according to the AMR scheme and outputs algebraic gain code I_GAIN2*c*(n).

A code multiplexer 76 multiplexes the LSP code, pitch-lag code, algebraic code, pitch-gain code and algebraic gain code, which are output from the quantizers 72*b* to 75*b* and 75*c*, adds on frame-type information (=S) to create speech code according to the AMR scheme, and transmits this code.

The foregoing operation is repeated in the speech activity segment to convert G.729A speech code to AMR speech code and output the same.

When there is a changeover from a speech activity segment to a silence segment, operation is as follows if hangover control is carried out: In accordance with a command from the transcoding controller 53, the changeover unit 77*a* selects the LSP parameter LSP1(k) obtained from the LSP code last received by the silence-code transcoder 60 and inputs this parameter to the LSP quantizer 72*b*. Further, the changeover unit 77*b* selects the pitch lag parameter lag(m) generated by pitch lag generator 101 and inputs this parameter to the pitch-lag quantizer 73*b*. Further, the changeover unit 77*c* selects the algebraic code parameter code(m) generated by the algebraic code generator 102 and inputs this code to the algebraic code quantizer 74*b*. Further, the changeover unit 77*d* selects the pitch gain parameter Ga(m) generated by the pitch gain generator 103 and inputs this parameter to the pitch-gain quantizer 75*b*. Further, the changeover unit 77*e* selects the frame power parameter POW1(k) obtained from the frame power code I_POW1(k) last received by the silence-code transcoder 60 and inputs this parameter to the algebraic-gain quantizer 75*c*.

The LSP quantizer 72*b* quantizes the LSP parameter LSP1(k), which has entered from the silence-code transcoder 60 via the changeover unit 77*a*, using the LSP quantization table of the AMR scheme, and outputs LSP code I_LSP2(n). The pitch-lag quantizer 73*b* quantizes the pitch-lag parameter, which has entered from the pitch lag generator 101 via the changeover unit 77*b*, using a pitch-lag quantization table according to the AMR scheme and outputs pitch-lag code I_LAG2(n). The algebraic quantizer 74*b* quantizes the algebraic-code parameter, which has entered from the algebraic code generator 102 via the changeover unit 77*c*, using an algebraic-code quantization table according to the AMR scheme and outputs algebraic code I_CODE2(n). The pitch-gain quantizer 75*b* quantizes the pitch-gain parameter, which has entered from the pitch gain generator 103 via the changeover unit 77*d*, using a pitch-gain quantization table according to the AMR scheme and outputs pitch-gain code I_GAIN2*a*(n). The algebraic-gain quantizer 75*c* quantizes the frame power parameter POW1(k), which has entered from the silence-code transcoder 60 via the changeover unit 77*e*, using an algebraic gain quantization table and outputs algebraic gain code I_GAIN2*c*(n).

The code multiplexer 76 multiplexes the LSP code, pitch-lag code, algebraic code, pitch-gain code and algebraic gain code, which are output from the quantizers 72*b* to 75*b* and 75*c*, adds on frame-type information (=S) to create speech code according to the AMR scheme, and transmits this code.

At the point of change from a speech activity segment to a silence segment, the speech transcoder 70 repeats the above operation until seven frames of speech activity code in the AMR scheme are transmitted. When the transmission of seven frame of speech activity code is completed, the speech transcoder 70 halts the output of speech activity code until the next speech activity segment is detected.

When the transmission of seven frames of speech activity code is completed, the switches S1, S2 in FIG. 11 are switched over to the terminals 3, 5, respectively, under the control of the transcoding controller 53, and CN-transcoding processing is thenceforth executed by the silence-code transcoder 60.

As shown in FIG. 13A, it is required that the (m+14)th and (m+15)th frames [the (n+7)th frame on the AMR side] that follow hangover be set as SID_FIRST frames in conformity with DTX control in the AMR scheme. However, transmission of a CN parameter is unnecessary and, hence, the code multiplexer 63 incorporates only information representing the SID_FIRST frame type in bst2(n+7) and outputs the same. CN transcoding is thenceforth executed in a manner similar to that of the third embodiment shown in FIG. 7.

The foregoing is CN transcoding in a case where hangover control is carried out. However, hangover control is not carried out in a case where the number of elapsed frames from the last time processing for conversion to an SID_UPDATE frame was executed to the frame at which the segment changes is 23 or less. The method of control in this case where hangover control is not performed will be described with reference to FIG. 13B.

The mth and (m+1)th frames, which are the boundary frames between a speech activity segment and a silence segment, are transcoded to speech activity frames in the AMR scheme and output by the speech transcoder 70 in a manner similar to that when hangover control was performed.

The ensuing (m+2)th and (m+3)th frames are transcoded to SID_UPDATE frames.

Further, for frames from the (m+4)th frame onward, a method identical with the transcoding method employed in the silence segment described in the third embodiment is used.

Figure 14:
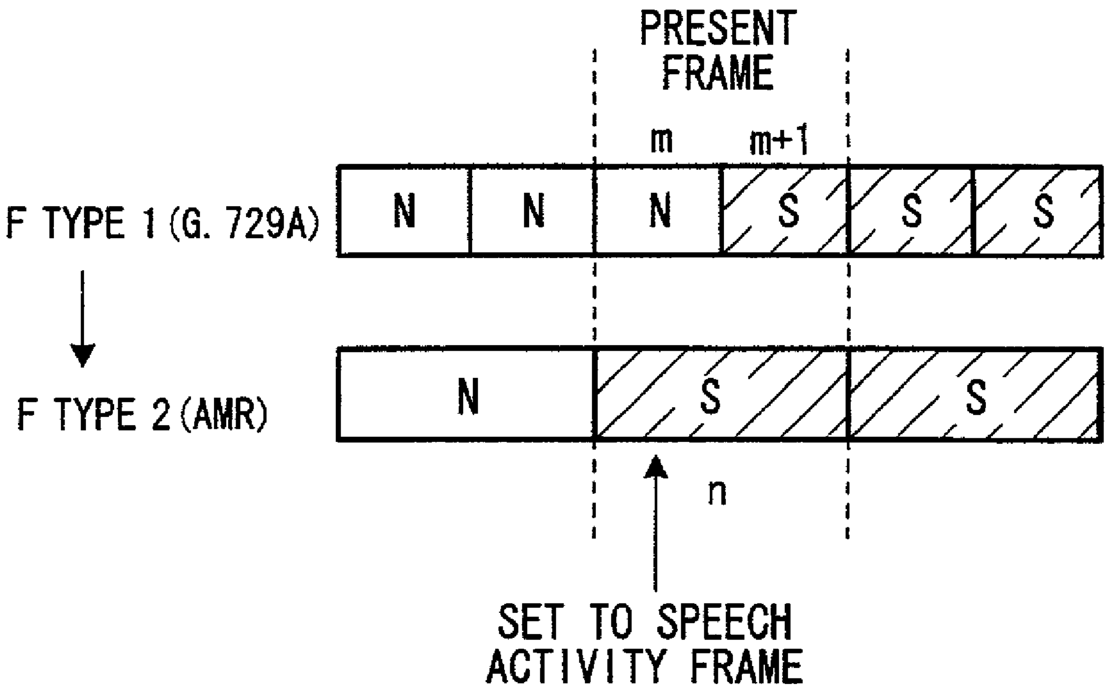
FIG. 14 is a diagram useful in describing transcoding control at a point where there is a change from silence to speech activity.
Figure 15:
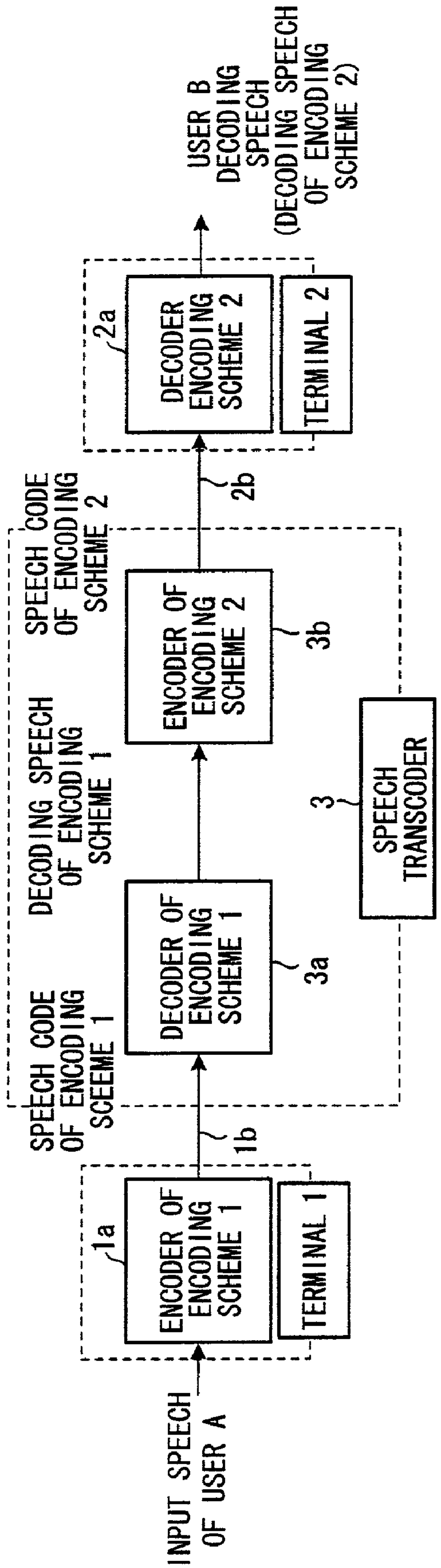
FIG. 15 PRIOR ART
FIG. 15 is a diagram useful in describing prior art 1 (a tandem connection)
Figure 16:
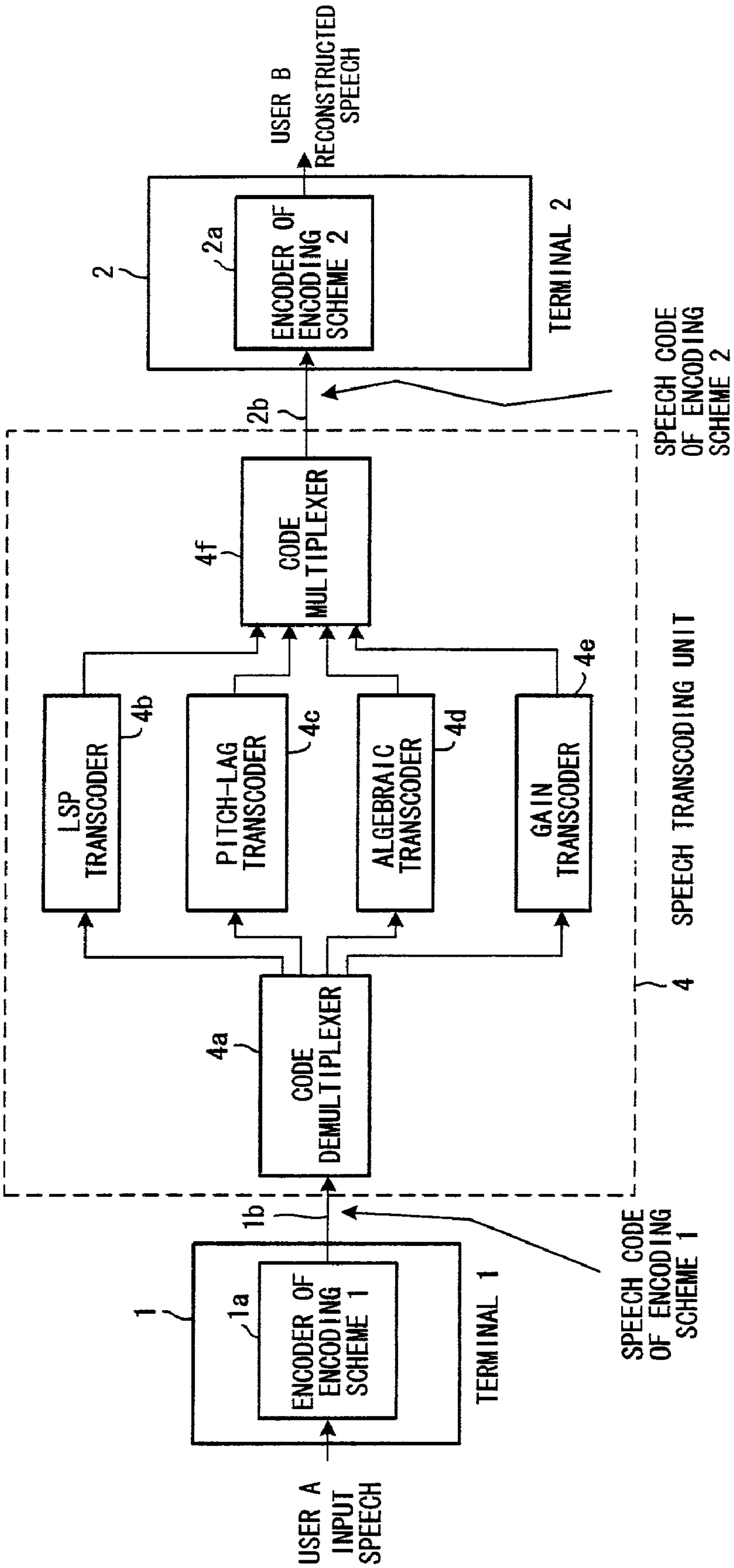
FIG. 16 PRIOR ART
FIG. 16 is a diagram useful in describing prior art 2.

The CN transcoding method at the point of change from a silence segment to a speech activity segment will now be described. FIG. 14 illustrates the temporal flow of this conversion control method. In a case where the mth frame in the G.729A scheme is a silence frame (SID frame or non-transmit frame) and the (m+1)th frame is a speech activity frame, this indicates a point at which there is a change from a silence segment to a speech activity segment. In this case, the nth frame in the AMR scheme is transcoded as a speech activity frame in order to prevent muted speech at the beginning of an utterance (i.e., disappearance of the rising edge of speech). Accordingly, the mth frame in the G.729A scheme, which is a silence frame, is transcoded as a speech activity frame. This transcoding method is the same as that used at the time of hangover, with the speech transcoder 70 making the transcoding to a speech activity frame in the AMR scheme and outputting this frame.

Thus, as described above, in accordance with this embodiment, if it is necessary to transcode a G.729A silence frame to an AMR speech activity frame at a point where a speech activity segment changes to a silence segment, a G.729A CN parameter is substituted for an AMR speech activity parameter, whereby a speech activity code in the AMR scheme can be produced.

In accordance with the present invention, which concerns communication between two speech communication systems having silence encoding methods that differ from each other, silence code (CN code), which has been obtained by encoding according to a silence encoding method on the transmitting side, can be transcoded to silence code (CN code) that conforms to a silence encoding method on the receiving side without once decoding the CN code to a CN signal. This makes it possible to achieve a high-quality transcoding to silence code.

Further, in accordance with the present invention, silence code (CN code) on the transmitting side can be transcoded to silence code (CN code) on the receiving side taking into account differences in frame length and in DTX control between the transmitting and receiving sides. This makes it possible to achieve a high-quality transcoding to silence code.

Further, in accordance with the present invention, normal code transcoding processing can be executed not only with regard to speech activity frames but also with regard to SID and non-transmit frames based upon a silence compression function. As a result, it is possible to perform transcoding between speech encoding schemes having a silence compression function, which was difficult to achieve with the speech transcoders of the prior art.

Further, in accordance with the present invention, speech transcoding between different communication systems can be performed while maintaining the effect of raising transmission efficiency by the silence compression function and while suppressing a decline in quality and transmission delay. Since almost all speech communication systems beginning with VoIP and cellular telephone systems employ the silence compression function, the effects of the present invention are great.

As many apparently widely different embodiments of the present invention can be made without departing from the spirit and scope thereof, it is to be understood that the invention is not limited to the specific embodiments thereof except as defined in the appended claims.

What is claimed is:

1. A speech transcoding method for transcoding a first speech code, which is obtained by encoding an input signal by a first speech encoding scheme, to a second speech code of a second speech encoding scheme, comprising the steps of:

demultiplexing a first silence code, which has been obtained by encoding a silence signal contained in the input signal by a silence compression function of the first speech encoding scheme, into a plurality of first element codes;

transcoding the plurality of first element codes to a plurality of second element codes that constitute a second silence code; and multiplexing the plurality of second element codes, which have been obtained by the transcoding, to thereby output the second silence code, wherein the first element codes are codes obtained by splitting the silence signal into frames comprising a fixed number of samples, and quantizing characteristic parameters, which represent characteristics of the silence signal obtained by analysis frame by frame, using quantization tables specific to the first speech encoding scheme; and the second element codes are codes obtained by quantizing said characteristic parameters using quantization tables specific to the second speech encoding scheme.

2. The method according to claim 1, wherein the characteristic parameters are an LPC (linear prediction coefficient), which represents the approximate shape of a frequency characteristic of the silence signal, and frame signal power representing an amplitude characteristic of the silence signal.

3. The method according to claim 1, wherein said step of converting the plurality of first element codes to a plurality of second element codes includes the steps of:

dequantizing the plurality of first element codes by dequantizers having quantization tables identical with those of the first speech encoding scheme; and quantizing the dequantized values of the plurality of first element codes, which have been obtained by the dequantization, by quantizers having quantization tables identical with those of the second speech encoding scheme.

4. A speech code transcoding method in a speech communication system for adopting a fixed number of samples of an input signal as a frame and mixing and transmitting, from a transmitting side, first speech code obtained by encoding a speech signal frame by frame in a speech activity segment according to a first speech encoding scheme and first silence code obtained by encoding a silence signal frame by frame in a silence segment according to a first silence encoding scheme, transcoding the first speech code and the first silence code to a second speech code according to a second speech encoding scheme and a second silence code according to a second silence encoding scheme, respectively, mixing the second speech code and second silence code, which have been obtained by the transcoding, and transmitting the mixed codes to a receiving side, said method comprising the steps of:

in the silence segment, transmitting silence code only in predetermined frames and refraining from transmitting silence code in frames other than the predetermined frames;

attaching frame-type information, which indicates a distinction among a speech activity frame, a silence frame and a non-transmit frame in which code is not transmitted, to each frame;

identifying the type of frame based upon the frame-type information; and in case of a silence frame and non-transmit frame, transcoding the first silence code to the second silence code taking into consideration a difference in frame length and a dissimilarity in silence-code transmission control between the first and second silence encoding schemes.

5. The method according to claim 4, further comprising the following steps:

when (1) the first silence encoding scheme is a scheme for transmitting averaged silence code every predetermined number of frames in a silence segment and refraining from transmitting silence code in other frames, (2) the second silence encoding scheme is a scheme for transmitting silence code only in frames wherein rate of change of the silence signal in a silence segment is large, refraining from transmitting silence code in other frames and, moreover, refraining from transmitting silence code successively, and (3) frame length in the first silence encoding scheme is twice frame length in the second silence encoding scheme;

transcoding code of a non-transmit frame in the first silence encoding scheme to code of two non-transmit frames in the second silence encoding scheme; and transcoding code of a silence frame in the first silence encoding scheme to two frames of code which consists of code of a silence frame and code of a non-transmit frame, in the second silence encoding scheme.

6. The method according to claim 5, wherein if, when there is a change from a speech activity segment to a silence segment, the first silence encoding scheme regards n successive frames, inclusive of a frame at a point where the change occurred, as speech activity frames and transmits speech code in these frames, and adopts the next frame as an initial silence frame that is not inclusive of silence code and transmits only frame-type information in this frame, then:

when the initial silence frame in the first silence encoding scheme has been detected, dequantized values obtained by dequantizing speech code of the immediately preceding n speech activity frames in the first speech encoding scheme are averaged to obtain an average value, and the average value is quantized to thereby obtain silence code in a silence frame of the second silence encoding scheme.

7. The method according to claim 4, further comprising the following steps: (1) when the first silence encoding scheme is a scheme for transmitting silence code only in frames wherein rate of change of the silence signal in a silence segment is large, refraining from transmitting silence code in other frames and, moreover, refraining from transmitting silence code successively, (2) the second silence encoding scheme is a scheme for transmitting averaged silence code every predetermined number N of frames in a silence segment and refraining from transmitting silence code in other frames, and, moreover, (3) frame length in the first silence encoding scheme is half frame length in the second silence encoding scheme;

averaging dequantized values of each silence code in 2×N successive frames of the first silence encoding scheme to obtain an average value and quantizing the average value to obtain silence code in a frame every N frames in the second silence encoding scheme; and with regard to frames other than the frame every N frames, transcoding code information of two successive frames of the first silence encoding scheme to code information of one non-transmit frame of the second silence encoding scheme irrespective of frame type.

8. The method according to claim 7, further comprising the following steps if, when there is a change from a speech activity segment to a silence segment, the second silence encoding scheme regards n successive frames, inclusive of a frame at a point where the change occurred, as speech activity frames and transmits speech code in these frames, and adopts the next frame as an initial silence frame that is not inclusive of silence code and transmits frame-type information in this frame;

generating first dequantized values of a plurality of element codes by dequantizing silence code of each silence frame in the first silence encoding scheme and, at the same time, generating second dequantized values of other element codes that are predetermined or random;

making transcoding to one frame of speech code in the second speech encoding system by quantizing each of said first and second dequantized values of the element codes in two successive frames using quantization tables of the second speech encoding scheme; and after n frames of speech code of the second speech encoding scheme are output, transmitting only frame-type information of said initial silence frame, which is not inclusive of silence code.

9. A speech transcoding apparatus for transcoding a first speech code, which is obtained by encoding an input signal by a first speech encoding scheme, to a second speech code of a second speech encoding scheme, comprising:

a code demultiplexer for demultiplexing a first silence code, which has been obtained by encoding a silence signal contained in the input sianal by a silence compression function of the first speech encoding scheme, into a plurality of first element codes;

element-code converters for transcoding the plurality of first element codes to a plurality of second element codes that constitute a second silence code; and a code multiplexer for multiplexing the second element codes, which have been obtained by said element-code converters, to thereby output the second silence code, wherein the first element codes are code obtained by splitting the silence signal into frames comprising a fixed number of samples, and quantizing characteristic parameters, which represent characteristics of the silence signal obtained by analysis frame by frame, using quantization tables specific to the first speech encoding scheme; and the second element codes are code obtained by quantizing said characteristic parameters using quantization tables specific to the second speech encoding scheme.

10. The apparatus according to claim 9, wherein each of said element-code converters includes:

a dequantizer for dequantizing the first element code based upon a quantization table identical with that of the first speech encoding scheme; and a quantizer for quantizing a dequantized value of the first element code, which has been obtained by said dequantizer, based upon a quantization table identical with that of the second speech encoding scheme.

11. A speech transcoding apparatus in a speech communication system for adopting a fixed number of samples of an input signal as a frame and mixing and transmitting, from a transmitting side, first speech code obtained by encoding a speech signal frame by frame in a speech activity segment according to a first speech encoding scheme and first silence code obtained by encoding a silence signal frame by frame in a silence segment according to a first silence encoding scheme, transcoding the first speech code and the first silence code to a second speech code according to a second speech encoding scheme and a second silence code according to a second silence encoding scheme, respectively, and transmitting the second speech code and second silence code, which have been obtained by the transcoding, to a receiving side, said apparatus comprising:

a frame-type identification unit for identifying distinction among a speech activity frame, a silence frame and a non-transmit frame in which silence code is not transmitted, based upon frame-type information that has been attached to each frame;

a silence-code transcoder for transcoding the first silence code in a silence frame to the second silence code by dequantizing the first silence code based upon a quantization table identical with that of the first silence encoding scheme and quantizing the dequantized value, which has thus been obtained, based upon a quantization table identical with that of the second silence encoding scheme; and a transcoding controller for controlling said silence-code transcoder taking into consideration a difference in frame length and a dissimilarity in silence-code transmission control between the first and second silence encoding schemes.

12. The apparatus according to claim 11, wherein when (1) the first silence encoding scheme is a scheme for transmitting averaged silence code very predetermined number of frames in a silence segment and refraining from transmitting silence code in other frames, (2) the second silence encoding scheme is a scheme for transmitting silence code only in frames wherein rate of change of the silence signal in a silence segment is large, refraining from transmitting silence code in other frames and, moreover, refraining from transmitting silence code successively, and, moreover, (3) frame length in the first silence encoding scheme is twice frame length in the second silence encoding scheme, said silence-code transcoder transcodes code of a non-transmit frame in the first silence encoding scheme to code of two non-transmit frames in the second silence encoding scheme, and transcodes code of a silence frame in the first silence encoding scheme to two frames of code which consists of code of a silence frame and code of a non-transmit frame, in the second silence encoding scheme.

13. The apparatus according to claim 12, wherein if, when there is a change from a speech activity segment to a silence segment, the first silence encoding scheme regards n successive frames, inclusive of a frame at a point where the change occurred, as speech activity frames and transmits speech code in these frames, and adopts the next frame as an initial silence frame that is not inclusive of silence code and transmits only frame-type information in this frame, then said silence-code transcoder includes:

a buffer for holding dequantized values obtained by dequantizing the latest n speech activity frames in the first speech encoding scheme;

an average-value calculation unit for averaging n dequantized values, which are held by said buffer, to obtain an average value; and a quantizer for quantizing the average value when the initial silence frame has been detected;

said silence-code transcoder outputting silence code in the second silence encoding scheme based upon an output from said quantizer.

14. The apparatus according to claim 11, wherein (1) when the first silence encoding scheme is a scheme for transmitting silence code only in frames wherein rate of change of the silence signal in a silence segment is large, refraining from transmitting silence code in other frames and, moreover, refraining from transmitting silence code successively, (2) the second silence encoding scheme is a scheme for transmitting averaged silence code every predetermined number N of frames in a silence segment and refraining from transmitting silence code in other frames, and moreover, (3) frame length in the first silence encoding scheme is half frame length in the second silence encoding scheme, said silence-code transcoder includes:

a buffer for holding dequantized values of each silence code in 2×N successive frames of the first silence encoding scheme;

an average-value calculation unit for calculating an average value of the dequantized values held by said buffer;

a quantizer for quantizing the average value to make transcoding to silence code every N frames in the second silence encoding scheme; and means which, with regard to frames other than a frame every N frames, is for transcoding code of two successive frames of the first silence encoding scheme to code of one non-transmit frame of the second silence encoding scheme irrespective of frame type.

15. The apparatus according to claim 14, wherein if, when there is a change from a speech activity segment to a silence segment, the second silence encoding scheme regards n successive frames, inclusive of a frame at a point where the change occurred, as speech activity frames and transmits speech code in these frames, and adopts the next frame as an initial silence frame that is not inclusive of silence code and transmits only frame-type information in this frame, said silence-code transcoder includes:

a dequantizer for generating first dequantized values of a plurality of element codes by dequantizing silence code of each silence frame in the first silence encoding scheme; and means for generating second dequantized values of a plurality of element codes that are predetermined or random every frame;

said silence-code transcoder making transcoding to and outputting one frame of speech code in the second speech encoding scheme by quantizing each of the first and second dequantized values of the element codes in two successive frames using quantization tables of the second speech encoding scheme, and, after n frames of speech code of the second speech encoding scheme are output, transmitting only frame-type information of said initial silence frame, which is not inclusive of silence code.

* * * * *